(12) United States Patent
Medra et al.

(10) Patent No.: US 11,153,139 B1
(45) Date of Patent: Oct. 19, 2021

(54) SYSTEM, METHOD AND APPARATUS FOR MULTI-BAND FASTER-THAN-NYQUIST SCHEME-BASED COMMUNICATION

(71) Applicant: HUAWEI TECHNOLOGIES CO., LTD., Guangdong (CN)

(72) Inventors: Ahmed Mohamed Medra, Kanata (CA); Hossein Najafi, Kanata (CA); Zhuhong Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/158,577

(22) Filed: Jan. 26, 2021

(51) Int. Cl.
| | | |
|---|---|---|
| H04L 27/10 | (2006.01) | |
| H04L 27/26 | (2006.01) | |
| H04L 25/03 | (2006.01) | |
| H04L 1/00 | (2006.01) | |

(52) U.S. Cl.
CPC ...... *H04L 27/26025* (2021.01); *H04L 1/0045* (2013.01); *H04L 25/03828* (2013.01); *H04L 25/03993* (2013.01); *H04L 27/10* (2013.01); *H04L 27/2627* (2013.01); *H04L 27/2649* (2013.01)

(58) Field of Classification Search
CPC ......... H04L 25/03834; H04L 25/03006; H04L 25/03949; H04L 25/03993; H04L 27/3494; H04L 27/10; H04L 27/26025; H04L 27/2627; H04L 27/2649; H04L 1/0045; H04L 25/03828
See application file for complete search history.

(56) References Cited

U.S. PATENT DOCUMENTS 10,135,540 B2 * 11/2018 Medra .................... H04J 11/004

OTHER PUBLICATIONS

Qiu, M. et al., Digital subcarrier multiplexing for fiber nonlinearity mitigation in coherent optical communication systems, Optics Express, vol. 22, No. 15, pp. 18770-18777, Jul. 28, 2014.
Colavolpe, G. et al., Faster-than-Nyquist and beyond: how to improved spectral efficiency by accepting interference, Optics Express, vol. 19, No. 27, pp. 26600-26609, Dec. 19, 2011.

(Continued)

*Primary Examiner* — Rahel Guarino
(74) *Attorney, Agent, or Firm* — BCF LLP

(57) ABSTRACT

The disclosed systems and methods are directed to transmitting and receiving symbols. In particular, splitting, a symbol dataset into symbol subsets, modulating, the symbol subsets using different sub-carriers, roll off factors and time acceleration factors, performing frequency shifting and combining the frequency shifted and modulated symbol subsets to generate a digital multiband (DMB) signal, transmitting and receiving the DMB signal, down converting the received DMB signal into a plurality of baseband signals, segregating the plurality of baseband signals in accordance with a manner by which the symbol subsets have been processed before transmission, forwarding a first portion of the plurality of baseband signals to a minimum mean square error (MMSE) based receiver, forwarding a second portion of the plurality of baseband signals to a matched filter-based receiver, and combining the output of the MMSE based receiver and matched filter-based receiver to generate an equivalent symbol dataset.

20 Claims, 12 Drawing Sheets

(56) References Cited

OTHER PUBLICATIONS

Anderson, J.B. et al., Faster-than-Nyquist Signaling, Proceedings of the IEEE, vol. 101, No. 8, pp. 1817-1830, Aug. 2013.
Jana, M. et al., Pre-Equalized Faster-Than-Nyquist Transmission, IEEE Transactions on Communications, vol. 65, No. 10, pp. 4406-4418, Oct. 2017.
Tomlinson, M., New automatic equiliser employing modulo arithmetic, Electronics Letters, vol. 7, No. 5/6, Mar. 25, 1971.

* cited by examiner

SYSTEM, METHOD AND APPARATUS FOR MULTI-BAND FASTER-THAN-NYQUIST SCHEME-BASED COMMUNICATION

CROSS-REFERENCE TO RELATED APPLICATIONS

This is the first application filed for the instantly disclosed technology.

TECHNICAL FIELD

The present disclosure generally relates to communication system and, in particular, to a system, and a method for Multi-Band Faster-than-Nyquist scheme-based communication.

BACKGROUND

In a communication system, signals conveying useful information are transmitted from the transmitter to the receiver through a given communication channel. To address the demands for increased data throughput, more and more data is transmitted over the channel. The information rate that is transmitted over a given bandwidth of the communication channel is known as "Spectral Efficiency". It is understood that higher spectral efficiency indicates a better utilization of the available resources.

There are several techniques that aim to increase the spectral efficiency of the communication system (over the same bandwidth). One common technique is to use higher order modulation formats. For example, using 16QAM (quadrature amplitude modulation) instead of QPSK (quadrature phase shift keying) provides 2× fold increase in the spectral efficiency. However, using higher order modulation increases the non-linearity induced in the optical fiber during transmission. This is in addition to the requirement of components of better quality as higher resolution Analog-to-Digital Converters (ADC) and Digital-to-Analog Converters (DAC) to reduce the implementation loss and quantization noise. Also, higher order modulations are more sensitive to imbalances between the two orthogonal components of the signal, i.e., in-phase (I) and quadrature (Q) components.

Another technique to increase the data rate while avoiding the implementation of higher order modulation is to increase the symbol rate and hence the transmission bandwidth. There exists a one-to-one relation between increasing the symbol rate and the bandwidth. Thus, to double the symbol rate, the system bandwidth has to be doubled as well. This imposes a lot of constraints, not only on the component requirements, but also on the receiver digital signal processing. From the components side, the operational bandwidth of corresponding analog and digital converters (i.e., ADCs and DACs) should be doubled as well. Also, data signals experience additional filtering effects due to the presence of electrical and optical filters, multiplexers, de-multiplexers, and other network elements in an optical network. In the presence of these optical impairments, the processing of the received optical signal at the receiver side faces many challenges that may result in reception failure. For instance, polarization de-multiplexing and equalization would be more complex at higher symbol rates in the presence of severe chromatic dispersion (CD), polarization mode dispersion (PMD) and possibly filtering. Also, timing recovery may be challenging with signal filtering due to corruption of timing information.

With this said, there is an interest in developing a communication system that improves the overall spectral efficiency and bandwidth utilization.

SUMMARY

The embodiments of the present disclosure have been developed based on developers' appreciation of shortcomings associated with the prior art namely, developing a communication system that improves the overall spectral efficiency and bandwidth utilization.

In accordance with the first broad aspect of the present disclosure, there is provided a transmitter comprising: a data separator configured to split a symbol dataset a[m] into symbol subsets $a_1[p], a_2[p] \ldots a_n[p]$, where m is an index of a symbol in the symbol dataset a[m] and p is an index of a symbol in the symbol subsets $a_1[p], a_2[p] \ldots a_n[p]$; a plurality of root raised cosine (RRC) pulse generators configured to individually modulate the symbol subsets $a_1[p], a_2[p] \ldots a_n[p]$ using different sub-carriers, roll off factors and time acceleration factors, wherein the modulation is based on a Faster-than-Nyquist (FTN) scheme; a plurality of frequency shifters configured to provide a frequency shift to the modulated symbol subsets $a_1[p], a_2[p] \ldots a_n[p]$; and an adder configured to combine the frequency shifted and modulated symbol subsets $a_1[p], a_2[p] \ldots a_n[p]$ to generate a digital multiband (DMB) signal $s_{DMB}(t)$ to be transmitted over a channel.

In accordance with other aspects of the present disclosure, the transmitter, wherein at least one of the symbol subsets $a_1[p], a_2[p] \ldots a_n[p]$ is pre-equalized by a linear pre-equalizer prior to modulating the at least one of the symbol subsets $a_1[p], a_2[p] \ldots a_n[p]$.

In accordance with other aspects of the present disclosure, the transmitter, wherein the DMB signal $s_{DMB}(t)$ is represented as:

$$s_{DMB}(t) = \sum_{n} e^{-j2\pi f_n t} \sum_{p} a_n[p] h_n(t - p\tau_n T_{DMB})$$

Where: $h_n(t - p\tau_n T_{DMB})$ is an impulse response of nth RRC pulse generator, $T_{DMB}$ is a symbol period, $\tau_n$ is a time acceleration factor of the nth RRC pulse generator by which the symbol period $T_{DMB}$ is modified, where $0 < \tau_n \leq 1$, and $f_n$ is an amount of frequency shift provided to the modulated symbol subset $a_n[p]$.

In accordance with other aspects of the present disclosure, the transmitter, wherein for at least one of the symbol subsets $a_1[p], a_2[p] \ldots a_n[p]$, a value of the time acceleration factor $\tau_n$ is equal to one.

In accordance with other aspects of the present disclosure, the transmitter further comprises a plurality of power scalers configured to scale powers of the frequency shifted and modulated symbol subsets $a_1[p], a_2[p] \ldots a_n[p]$ prior to combining by the adder.

In accordance with the second broad aspect of the present disclosure, there is provided a receiver comprising: a signal down-converter configured to down convert a received digital multiband (DMB) signal $s_{DMB}(t)$ into a plurality of baseband signals $r_1(t), r_2(t), \ldots r_n(t)$ associated with a plurality symbol subsets $a_1[p], a_2[p] a_n[p]$ respectively; a controller configured to: segregate the plurality of baseband signals $r_1(t), r_2(t), r_n(t)$ in accordance with a manner by which the plurality symbol subsets $a_1[p], a_2[p] \ldots a_n[p]$ have been processed by a transmitter, forward a first portion of the plurality of baseband signals $r_1(t)$, $r_2(t)$, $r_n(t)$ to a minimum mean square error (MMSE) based receiver for further processing, and forwarding a second portion of the plurality of baseband signals $r_1(t)$, $r_2(t)$, $r_n(t)$ to a matched filter-based receiver for further processing; and a combiner configured to combine the output of the MMSE based receiver and matched filter-based receiver to generate an equivalent symbol dataset a'[m] representative of a transmitted symbol dataset a[m].

In accordance with other aspects of the present disclosure, the receiver, wherein the MMSE based receiver comprises: a plurality of linear MMSE filters configured to process individual baseband signals to reduce inter-symbol interference introduced due to Faster-than-Nyquist (FTN) scheme based modulation of the plurality symbol subsets $a_1[p]$, $a_2[p]$ ... $a_n[p]$; a post equalization module including a plurality of whitening filters and a plurality of non-linear post-equalizers configured to perform post-equalization noise whitening and compute log-likelihood ratios (LLRs) from outputs of the plurality of linear MMSE filters; and a plurality of forward error correction (FEC) decoders configured to individually decode the received symbols in the baseband signals based on LLRs.

In accordance with other aspects of the present disclosure, the receiver, wherein a type of the non-linear post-equalizer is selected based on a time acceleration factor $\tau_n$.

In accordance with other aspects of the present disclosure, the receiver, wherein for $0.9 < \tau_n < 1$ the non-linear equalizer is a Decision Feedback Equalizer (DFE) based non-linear equalizer and for $\tau_r \leq 0.9$ the non-linear equalizer is Bahl, Cocke, Jelinek and Raviv (BCJR) based non-linear equalizer.

In accordance with other aspects of the present disclosure, the receiver, wherein, if a channel is an optical channel, the receiver further comprises a plurality of least mean square (LMS) equalizers configured to operate on output from the plurality of linear MMSE filters to reverse the effect of channel of the received signal.

In accordance with other aspects of the present disclosure, the receiver, wherein the plurality of FEC decoders are turbo-decoders configured to estimate the transmitted symbols in the baseband signals based on LLRs and provide a selective iterative feedback to the plurality of non-linear pre-equalizers.

In accordance with other aspects of the present disclosure, the receiver, wherein the selective feedback is associated with the symbol subsets $a_1[p]$, $a_2[p]$ ... [p] modulated with the time acceleration factor $\tau_n < 1$ and are not pre-equalized by the transmitter.

In accordance with other aspects of the present disclosure, the receiver, wherein the MMSE based receiver is configured to operate on the first portion of the plurality of baseband signals $r_i(t)$, $r_2(t)$, ... $r_n(t)$ whose associated symbol subsets $a_1[p]$, $a_2[p]$ ... $a_n[p]$ have not been pre-equalized by the transmitter.

In accordance with other aspects of the present disclosure, the receiver, wherein matched filter-based receiver comprises: a plurality of frequency shifters configured to provide a frequency shift to the second portion of the plurality of baseband signals $r_1(t)$, $r_2(t)$, ... $r_n(t)$; and a plurality of whitened matched filters configured to estimate transmitted symbols in the frequency shifted second portion of the plurality of baseband signals $r_1(t)$, $r_2(t)$, ... $r_n(t)$ In accordance with other aspects of the present disclosure, the receiver, wherein the matched filter-based receiver is configured to operate on the second portion of the plurality of baseband signals $r_1(t)$, $r_2(t)$, ... $r_n(t)$ whose associated symbol subsets $a_1[p]$, $a_2[p]$ ... $a_n[p]$ have been pre-equalized by the transmitter.

In accordance with the first broad aspect of the present disclosure, there is provided a method of communication comprising: splitting, by a data separator, a symbol dataset a[m] into symbol subsets $a_1[p]$, $a_2[p]$ $a_n[p]$, where m is an index of a symbol in the symbol dataset [m] and p is an index of a symbol in the symbol subsets $a_1[p]$, $a_2[p]$ $a_n[p]$; modulating, by a plurality of root raised cosine (RRC) pulse generators, the symbol subsets $a_1[p]$, $a_2[p]$ ... $a_n[p]$ using different sub-carriers, roll off factors and time acceleration factors, wherein the modulation is based on a Faster-than-Nyquist (FTN) scheme; performing frequency shifting, by a plurality of frequency shifters, on the modulated symbol subsets $a_1[p]$, $a_2[p]$ ... $a_n[p]$; combining, by an adder, the frequency shifted and modulated symbol subsets $a_1[p]$, $a_2[p]$ ... $a_n[p]$ to generate a digital multiband (DMB) signal $s_{DMB}(t)$ to be transmitted over a communication channel; transmitting, by a transmitter, the DMB $s_{DMB}(t)$ over a communication channel; receiving, by a receiver, the DMB signal $s_{DMB}(t)$ transmitted over the communication channel; down converting, by a signal down-converter, the received DMB signal $s_{DMB}(t)$ into a plurality of baseband signals $r_1(t)$, $r_2(t)$, $r_n(t)$ associated with the symbol subsets $a_1[p]$, $a_2[p]$ ... $a_n[p]$ respectively; segregating, by a controller, the plurality of baseband signals $r_1(t)$, $r_2(t)$, ... $r_n(t)$ in accordance with a manner by which the symbol subsets $a_1[p]$, $a_2[p]$ ... $a_n[p]$ have been processed before transmission; forwarding, by the controller, a first portion of the plurality of baseband signals $r_1(t)$, $r_2(t)$, ... $r_n(t)$ to a minimum mean square error (MMSE) based receiver for further processing; forwarding, by the controller, a second portion of the plurality of baseband signals $r_1(t)$, $r_2(t)$, ... $r_n(t)$ to a matched filter-based receiver for further processing; and combining, by a combiner, the output of the MMSE based receiver and matched filter-based receiver to generate an equivalent symbol dataset a'[m] representative of the symbol dataset a[m].

In accordance with other aspects of the present disclosure, the method, wherein the DMB signal $s_{DMB}(t)$ is represented as:

$$s_{DMB}(t) = \sum_n e^{-j2\pi f_n t} \sum_p a_n[p] h_n(t - p\tau_n T_{DMB})$$

Where: $h_n(t-p\tau_n T_{DMB})$ is an impulse response of nth RRC pulse generator, $T_{DMB}$ is a symbol period, $\tau_r$, is a time acceleration factor of the nth RRC pulse generator by which the symbol period $T_{DMB}$ is modified, where $0 < \tau_n \leq 1$, and $f_n$ is an amount of frequency shift provided to the modulated symbol subset $a_n[p]$ In accordance with other aspects of the present disclosure, the method further comprises: processing individual baseband signals, by a plurality of linear MMSE filters, to reduce inter-symbol interference introduced due to FTN scheme based modulation of the plurality symbol subsets $a_1[p]$, $a_2[p]$ ... $a_n[p]$; performing, by a post equalization module, post-equalization noise whitening and computing log-likelihood ratios (LLRs) from outputs of the plurality of linear MMSE filters; and decoding, by a plurality of forward error correction (FEC) decoders, the received symbols in the baseband signals based on LLRs.

In accordance with other aspects of the present disclosure, the method, further comprises: frequency shifting, by a plurality of frequency shifters, the second portion of the plurality of baseband signals $r_1(t)$, $r_2(t)$, ... $r_n(t)$; and estimating, by a plurality of whitened matched filters, transmitted symbols in the frequency shifted second portion of the plurality of baseband signals $r_1(t)$, $r_2(t)$, ... $r_n(t)$.

In accordance with other aspects of the present disclosure, the method, further comprises scaling powers of the frequency shifted and modulated symbol subsets $a_1[p]$, $a_2[p]$ ... $a_n[p]$ prior to combining by the adder.

BRIEF DESCRIPTION OF THE FIGURES

Further features and advantages of the present disclosure will become apparent from the following detailed description, taken in combination with the appended drawings, in which.

Figure 1:
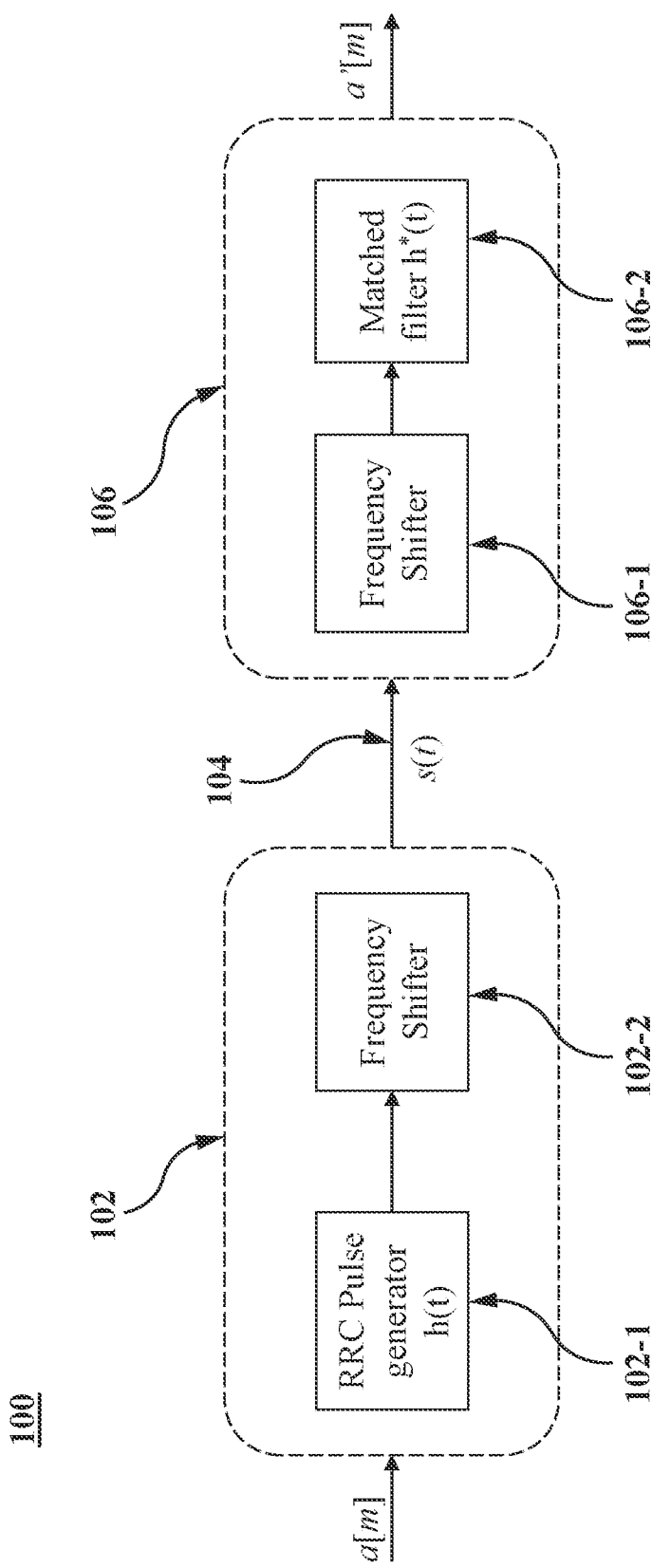
FIG. 1 (Prior Art) illustrates a high-level functional block diagram of a conventional communication system.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes a system and method for Multi-Band Faster-than-Nyquist scheme-based communication.

Unless otherwise defined or indicated by context, all technical and scientific terms used herein have the same meaning as commonly understood by one of ordinary skill in the art to which the described embodiments appertain to.

In the context of the present specification, "controller" is any computer hardware that is capable of running software appropriate to the relevant task at hand. In the context of the present specification, in general the term "controller" is associated with a user of the controller. Thus, some (non-limiting) examples of controllers include personal computers (desktops, laptops, netbooks, etc.), smartphones, and tablets, as well as network equipment such as routers, switches, and gateways. It should be noted that a device acting as a controller in the present context is not precluded from acting as a server to other controllers. The use of the expression "a controller" does not preclude multiple controllers being used in receiving/sending, carrying out or causing to be carried out any task or request, or the consequences of any task or request, or steps of any method described herein.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes a system and method for Multi-Band Faster-than-Nyquist scheme-based communication.

FIG. 1 (Prior Art) illustrates a high-level functional block diagram of a conventional communication system 100. As shown, conventional communication system 100 includes a transmitter 102 and a receiver 106. The transmitter 102 includes a root raised cosine pulse (RRC) generator 102-1 and a frequency shifter 102-2. The receiver 106 includes a frequency shifter 106-1 and a matched filter 106-2. It is to be noted that transmitter 102 and receiver 106 may include additional components but have been omitted from FIG. 1 for the purpose of simplicity.

In conventional communication system 100, transmitter 102 processes symbols a[m] to be transmitted using RRC pulse generator 102-1 and frequency shifter 102-2 and generate a signal s(t). The transmitter 102 transmits the signal s(t) over a channel 104 to receiver 106. The channel 104 may be a wireless channel or an optical channel. If the channel is wireless, the signal s(t) may be transmitted as a radio signal and if the channel is optical, the signal s(t) may be transmitted as an optical signal.

The conventional communication system 100 relies on single carrier transmission, and the transmitted signal s(t) (without any frequency shift) is expressed as:

$$s(t) = \sum_m a[m]h(t - mT) \qquad (1)$$

where a[m] represents the symbols to be transmitted and h(t) is the shaping pulse of duration T second. Typically, an RRC with a roll-off factor α is used as the shaping pulse. The pulse h(t) should satisfy an orthogonality condition. The orthogonality condition implies that the pulse h(t) is orthogonal with respect to shifts by mT and hence symbol by symbol detection at receiver 106 side is optimal by using matched filter 106-2 and sampling every T second. Since, the symbol rate is 1/T Hz, this requires a bandwidth of:

$$BW = (1 + \alpha) * f_s = \frac{1 + \alpha}{T} \qquad (2)$$

where $$f_s = \frac{1}{T}$$

is the symbol rate or baud rate. A higher symbol rate requires a larger bandwidth, which represents a challenge to receiver 106.

Figure 2A:
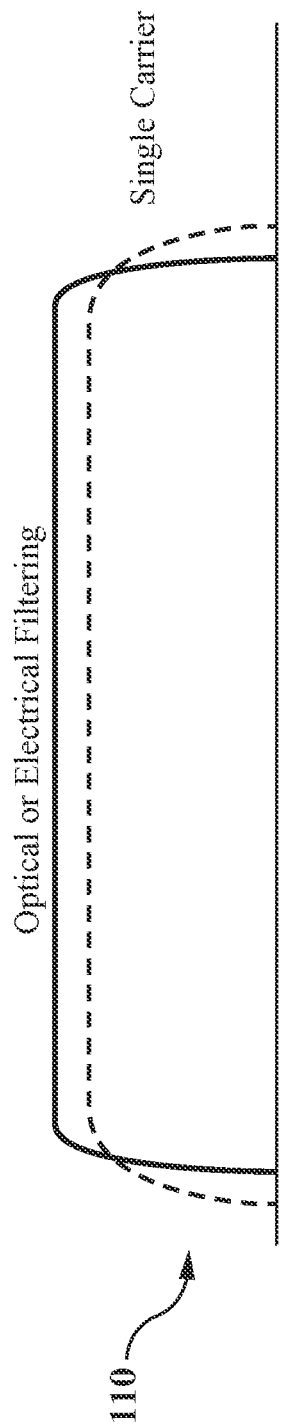
FIG. 2A (Prior Art) illustrates a transmission bandwidth associated with a single carrier.

Moreover, single carrier transmissions over a large bandwidth may degrade a performance of receiver 106, from several design aspects. First, extracting timing information to synchronize the received signal with the transmitted signal may be very difficult, especially when conventional communication system 100 is optical and includes optical filtering. Second, equalization of the channel impairments, such as, for example, Polarization Mode Dispersion (PMD) and Chromatic Dispersion (CD), may require sophisticated equalizers due to the large signal bandwidth. Finally, if constellation shaping is implemented to achieve shaping and performance gains, equalization may be complicated due to adopting a constellation with non-equiprobable symbols. FIG. 2A (Prior Art) illustrates a transmission bandwidth 110 associated with a single carrier.

Figure 2B:
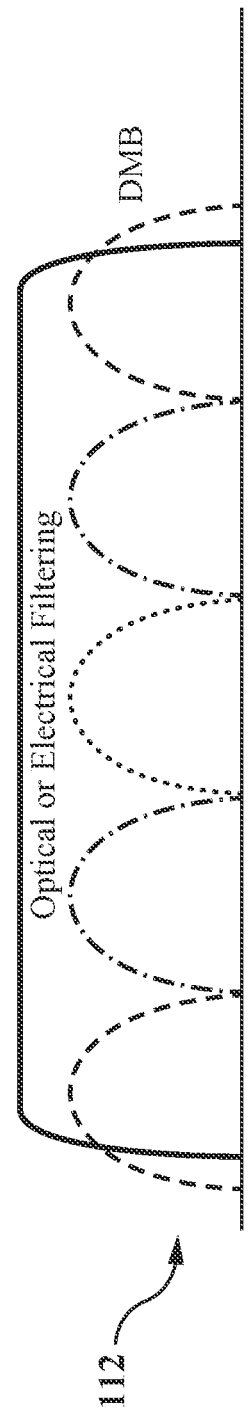
FIG. 2B (Prior Art) illustrates sub-carrier bandwidths 112 during Digital Multiband (DMB) transmission.

In order to improve a performance of a communication system, certain conventional techniques propose Digital Multiband (DMB) transmission. During DMB transmission, instead of transmitting the signal s(t) on a single carrier occupying the total bandwidth, the signal s(t) is transmitted over multiple digitally synthesized sub-carriers, in which each sub-carrier bandwidth is a fraction of the total bandwidth as illustrated in FIG. 2B (Prior Art). FIG. 2B illustrates sub-carrier bandwidths 112 during DMB transmission.

In case of DMB transmission, transmitter 102 may be configured to modulate portions of a[m] over sub-carriers and the transmitted signal can be expressed as:

$$s_{DMB}(t) = \sum_{n=1}^{N_{DMB}} e^{-2\pi f_n t} \sum_p a_n[p]h(t - pT_{DMB}) = \sum_{n=1}^{N_{DMB}} e^{-2\pi f_n t} s_{sc}(n, t) \quad (3)$$

$$s_{sc}(n, t) = \sum_p a_n[p]h(t - pT_{DMB}) \quad (4)$$

where $N_{DMB}$ is the number of DMB sub-carriers, $f_n$ is the frequency translation of sub-carrier n, $a_n[p]$ is the data symbol dedicated for sub-carrier n, and $T_{DMB}$ is the symbol period for a DMB symbol where $T_{DMB} = N_{DMB} T_{sc}$. The DMB transmission can be expressed as a summation of single carrier transmissions, in which each sub-carrier $s_{sc}(n, t)$ has a symbol period of $T_{DMB}$, thus a symbol rate of $$f_{DMB} = \frac{1}{T_{DMB}},$$

and shifted in the spectrum by a frequency offset of $f_n$ such that the sub-carriers do not overlap in the frequency domain. Accordingly, DMB transmission can be classified as an orthogonal transmission in which matched filtering and sampling every $T_{DMB}$ second per sub-carrier suffices for optimal symbol by symbol detection.

In this way, timing information can be extracted from middle sub-carriers, which do not suffer from optical or electrical filtering, and the effect of optical impairments will be dramatically reduced, leading to easier and faster equalization. Also, DMB transmission has been reported to reduce non-linear effects. On the other hand, DMB transmission is more sensitive to filtering compared to single carrier transmission, leading to performance degradation. This is due to the fact that filtering affects the outer sub-carriers, cutting part of their spectra as shown in FIG. 2B, which is a fraction of the total bandwidth by design.

With this said, to increase the spectral efficiency without using higher order modulation, various embodiments of the present disclosure rely on Faster-than-Nyquist (FTN) signaling. In particular, FTN signaling contravenes conventional Nyquist scheme for interference-free transmission, by employing a non-orthogonal transmission scheme, in which the received symbols interfere with each other. As compared to conventional Nyquist transmission, the symbol rate (and hence data rate) of FTN signaling is higher than conventional Nyquist signaling given the same bandwidth, resulting in higher spectral efficiency. Also, for a given symbol rate, FTN signaling occupies smaller bandwidth than the corresponding Nyquist signalling.

In the present disclosure, FTN signaling may be applied for DMB transmission per sub-carrier. This provides a very flexible implementation strategy in which each sub-carrier modulation format, shaping gain, power scaling and transmission bandwidth may be optimized independently from other sub-carriers in order to allow system convergence such as solving Timing Recovery (TR) issues, maximize performance gains, and/or reduce implementation complexity. As one example, FTN DMB transmission may be implemented such that the required bandwidth is reduced to achieve a given data rate, thus eliminating or reducing the filtering effect from the side tones (sub-carriers). In another example, power scaling, shaping gain and transmission bandwidth may be optimized to provide the best water filing strategy to maximize the system spectral efficiency.

Figure 3:
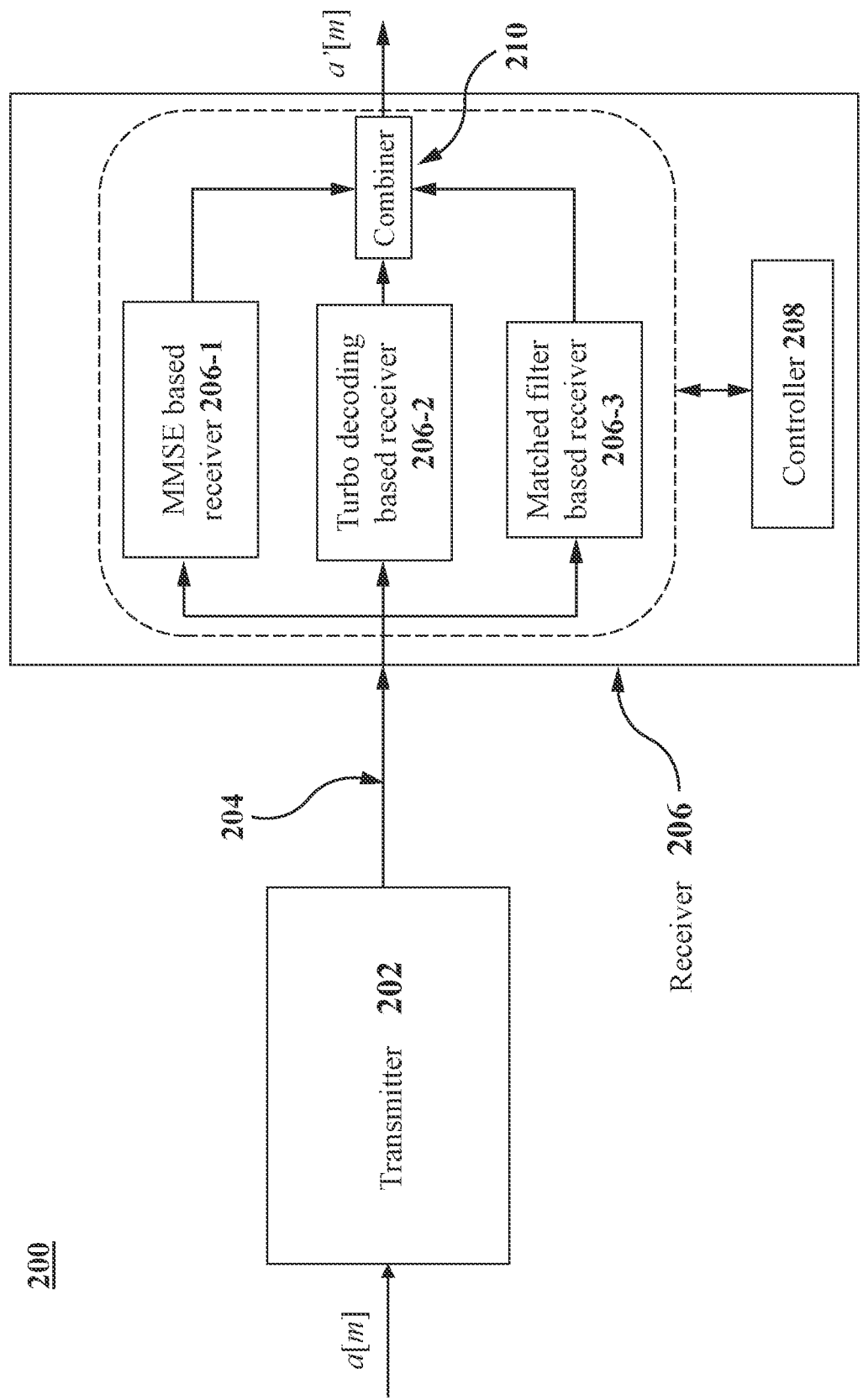
FIG. 3 illustrates a high-level functional block diagram of a communication system, in accordance with various embodiments of present disclosure.

FIG. 3 illustrates a high-level functional block diagram of a communication system 200, in accordance with various embodiments of present disclosure. As shown, communication system 200 includes a transmitter 202 and a receiver 206. The receiver 206 may include a minimum mean square error (MMSE) based receiver 206-1, turbo decoding based receiver 206-2, whitened matched filter-based receiver 206-3, a combiner 210, and a controller 208.

The transmitter 202 may be configured to transmit a signal over a communication channel 204 towards receiver 206. In certain embodiments the transmitted signal may be a radio signal and communication channel 204 may be a wireless channel. In other embodiments, the transmitted signal may be an optical signal and communication channel 204 may be an optical channel. It is contemplated if the transmitted signal is a radio signal then transmitter 202 and receiver 206 may have the associated components known in the art such as, for example transmitting and receiving antennas. Also, if the transmitted signal is an optical signal then transmitter 202 and receiver 206 may have the associated components known in the art such as, for example electrical to optical convertors and optical to electrical convertors or the like. Such components have been omitted from the present disclosure for the purpose of simplicity.

Figure 4:
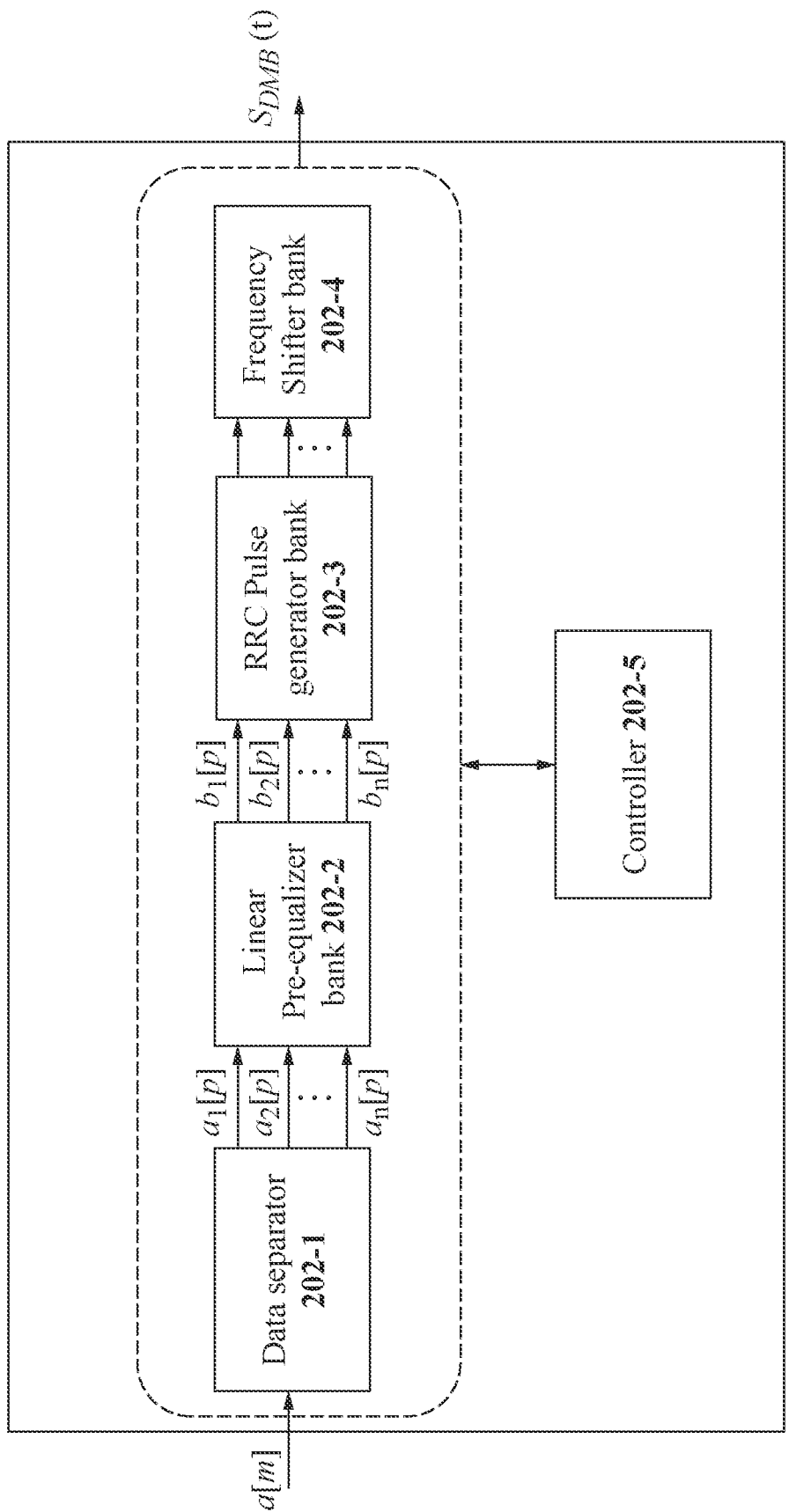
FIG. 4 illustrates a high-level functional block diagram of a transmitter included in the communication system, in accordance with various embodiments of present disclosure.

FIG. 4 illustrates a high-level functional block diagram of transmitter 202, in accordance with various embodiments of present disclosure. As shown, transmitter 202 may include a data separator 202-1, a linear pre-equalizer bank 202-2, a root raised cosine pulse (RRC) pulse bank generator 202-3, frequency shifter bank 202-4, controller 202-5. It is to be noted transmitter 202 may include additional components but have been omitted for the purpose of simplicity.

The controller 202-5 may be configured to control functionality of various components of transmitter 202. The data separator 202-1 may receive a symbol dataset a[m], where m is the index of a symbol inside the symbol dataset a[m]. The data separator 202-1 may be configured to break (e.g.

split, divide, segregate, separate, partition or the like) the symbol dataset a[m] to smaller symbol subsets $a_1[p]$, $a_2[p]$ ... $a_n[p]$, where n is the number of subsets and p is the index of a symbol inside the symbol subset. In certain embodiments, controller 202-5 may instruct data separator 202-1 with the size by which the symbol dataset a[m] are to be break into smaller symbol subsets $a_1[p]$, $a_2[p]$ ... $a_n[p]$. The smaller symbol subsets $a_1[p]$, $a_2[p]$ ... $a_n[p]$ are forwarded to linear pre-equalizer bank 202-2.

Figure 5:
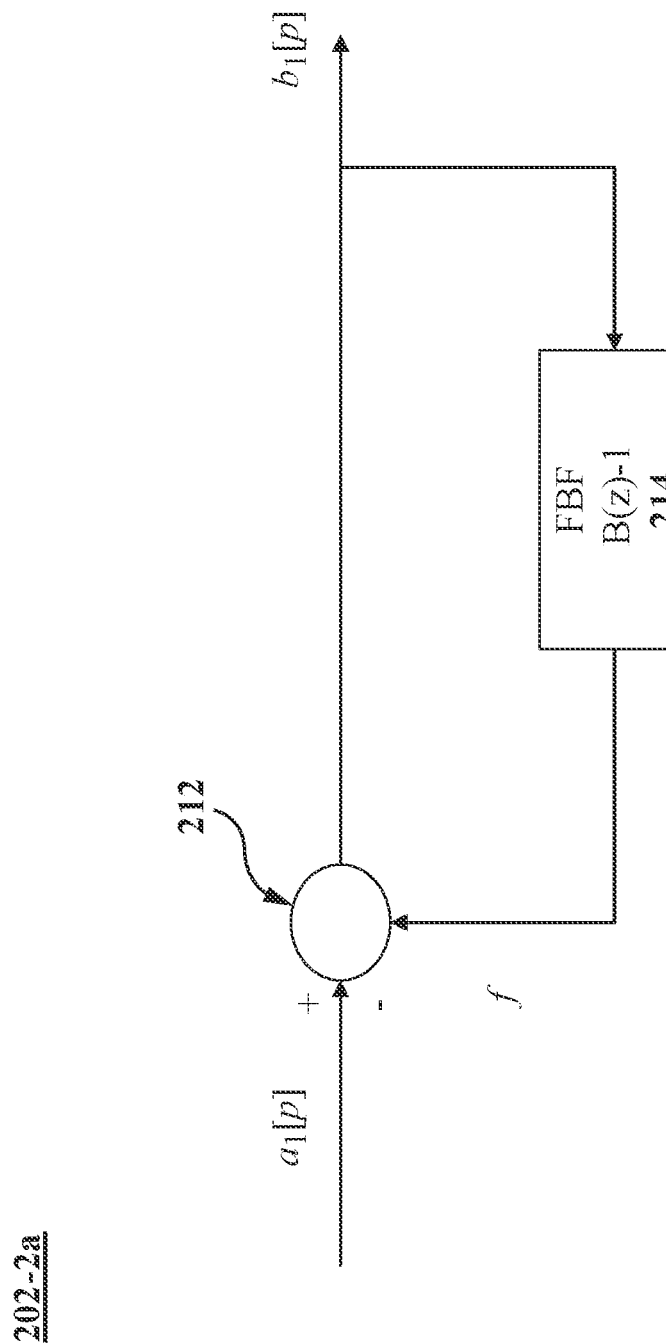
FIG. 5 illustrates a non-limiting example of a linear pre-equalizer, in accordance with various embodiments of the present disclosure.

The linear pre-equalizer bank 202-2 may include a plurality of linear pre-equalizers. By way of example, FIG. 5 illustrates a non-limiting example of a linear pre-equalizer 202-2a, in accordance with various embodiments of the present disclosure. In certain embodiments, without limiting the scope of present disclosure, linear pre-equalizer 202-2a may exhibit a same structure as that of Tomlinson-Harashima Precoding (THP), which is widely discussed in the literature as a non-linear precoding method in communication systems. The only difference between linear pre-equalizer 202-2a and the THP is the removal of the "modulo" operation, and therefore, this linear pre-equalizer 202-2a may entirely be a simple infinite impulse response (IIR) filter. The removal of the "modulo" operation prevents the "modulo loss" or "power loss" associated with THP. The feedback filter (FBF) B (z) may designed based on the FTN time acceleration factor $\tau_n$ (discussed below). It is to be noted that each of the plurality of linear pre-equalizers included in may be implemented in a similar as linear pre-equalizer 202-2a.

Returning to FIG. 4, at least some of the symbol subsets $a_1[p]$, $a_2[p]$ ... $a_n[p]$ may be pre-equalized by linear pre-equalizer bank 202-2. In certain embodiments, controller 202-5 may be configured to decide which symbol subset may be pre-equalized and which is not. The same information may be available with the receiver 206 as well. That is, transmitter 202 and receiver 206 may be configured to operate in synchronization. By way of example, symbol subsets $a_1[p]$, $a_2[p]$ ... $a_s[p]$ may be pre-equalized and symbol subsets $a_6[p]$, $a_7[p]$ ... $a_n[p]$ may not be pre-equalized. In certain embodiments, none of the symbol subsets $a_1[m]$, $a_2[p]$ ... $a_n[p]$ may be pre-equalized while in other embodiments, all of the symbol subsets $a_1[p]$, $a_2[p]$ ... $a_n[p]$ may be pre-equalized. The selection of number of symbol subsets $a_1[p]$, $a_2[p]$ ... $a_n[p]$ to be pre-equalized may depend upon the availability of system resources.

It is to be noted that that the linear pre-equalization operation at transmitter 202 may alter the characteristics symbol subsets in the sense that it increases the peak-to-average-power ratio (PAPR). Although, such techniques may require digital-to-analog convertors (DAC) with higher resolution, however, linear pre-equalization may eliminate the inter-symbol interference (ISI) induced by FTN signaling, so post equalization and Turbo equalization may not be required at receiver 206.

The output of linear pre-equalizer bank 202-2 may be represented as pre-equalized symbol subsets $b_i[p]$, $b_2[p]$ $b_n[p]$. It is to be noted that not every subset in $b_1[p]$, $b_2[p]$ ... $b_n[p]$ may be pre-equalized, however, for the purpose of simplicity, symbol subsets [p], $a_2[p]$ $a_n[p]$ may be represented as pre-equalized symbol subsets $b_1[p]$, $b_2[p]$ ... $b_n[p]$.

The RRC pulse generator bank 202-3 and frequency shifter bank 202-4 may include a plurality of RRC pulse generators and a plurality of frequency shifters respectively that are configured to process the pre-equalized symbol subsets $b_1[p]$, $b_2[p]$ ... $b_n[p]$. Each of the plurality of RRC pulse generators in RRC pulse generator bank 202-3 may have a different frequency response, due to different roll off factors, to modulate the pre-equalized symbol subsets $b_1[p]$, $b_2[p]$ ... $b_n[p]$ individually using different sub-carriers, roll off factors and time acceleration factors based on FTN scheme. Different modulated pre-equalized symbol subsets $b_1[p]$, $b_2[p]$ ... $b_n[p]$ may be combined to generate a DMB signal $s_{DMB}(t)$ to be transmitted over communication channel 204.

In contrast to a single carrier transmission where the system components are required to operate at higher bandwidth, components associated with receiver 202 may be relatively simpler as the components operates on a smaller bandwidth associated with each sub-carrier. As previously discussed, each sub-carrier modulation format, shaping gain and transmission bandwidth may be configured independently from other sub-carriers to improve performance of transmitter 202 at least in terms of TR issues, performance gains, reducing implementation complexity or the like.

In certain embodiments, RRC pulse generator bank 202-3 may operate in conjunction with frequency shifter bank 202-4 to perform FTN signaling per DMB sub-carrier and may violate the condition of time-domain orthogonality. FTN signaling is a linear modulation scheme that aims to increase spectral efficiency by reducing the time and/or frequency spacing between two adjacent pulses, therefore introducing controlled inter-symbol and/or inter-carrier interference. Similar to Nyquist transmission, for single carrier FTN signalling, the transmitted signal can be expressed as:

$$s(t)=\Sigma_m a[m]h(t-\tau mT) \quad (5)$$

where $0<\tau<1$ is the time acceleration factor ($\tau=1$ for Nyquist signaling). However, for FTN signalling based DMB transmission, the signal to be transmitted may be expressed as:

$$s_{DMB}(t) = \sum_{n=1}^{N_{DMB}} e^{-j2\pi f_n t} \sum_p b_n[p]h_n(t - p\tau_n T_{DMB}) \quad (6)$$

$$s_{sc}(n, t) = \sum_p b_n[p]h_n(t - p\tau_n T_{DMB}) \quad (7)$$

where $0<\tau_n<1$ is the time acceleration factor for nth sub-carrier.

By way of example, the pre-equalized symbol subsets $b_1[p]$ may be processed by a first RRC pulse generator in RRC pulse generator bank 202-3 to generate a modulated signal $s_{sc}(1, t)$ which may be equal to $\Sigma E_p b_1[p]h_1(t-p\tau_1 T_{DMB})$, where $h_i(t-p\tau_i T_{DMB})$ may be the impulse response of the first RRC pulse generator and $\tau_1$ is the time acceleration factor by which the symbol period $T_{DMB}$ may be reduced. The first RRC pulse generator may forward $s_{sc}(1,t)$ to a first frequency shifter in frequency shifter bank 202-4. The first frequency shifter may provide a frequency shift to the $s_{sc}(1, t)$ represented by $e^{-j2\pi f_1 t}$, where $f_1$ may be the amount of frequency shift. The frequency shifted $s_{sc}(1, t)$ may be represented as $$s_1(t)=\Sigma_p b_1[p]h_1(t-p\tau_1 T_{DMB}) \cdot e^{-j2\pi f_1 t} \quad (8)$$

In a similar manner, other RRC pulse generator in RRC pulse generator bank 202-3 in conjunction with other frequency shifter in frequency shifter bank 202-4 may generate a plurality of signals $s_2(t), s_2(t), \ldots s_n(t)$. The transmitter 202 may include an adder (not illustrated for the purpose of simplicity) that may be configured to combine the plurality of signals $s_1(t), s_2(t), s_2(t), \ldots, s_n(t)$ to generate the DMB signal $s_{DMB}(t)$ as represented by equation (6) to be transmitted over a communication channel. It is to be noted that a bandwidth of each of the plurality of signals $s_1(t)$, $s_2(t)$, $s_2(t)$, ... $s_n(t)$ may be very less than as compare to the single carrier signal.

In certain non-limiting embodiments, transmitter 202 may further include a power scaler bank (not illustrated for the purpose of simplicity). The power scaler bank may include a plurality of power scalers configured to scale (e.g., increase, decrease, change, alter, modify, update, amplify, attenuate or the like) the powers associated with the modulated signals $s_{sc}(n, t)$ by a factor $K_n$, where $K_n$ represents nth power scaling factor associated with nth modulating signal $s_{sc}(n, t)$. One of the non-limiting examples of the power scalers may include amplifiers. The plurality of power scalers my be configured to operate on the frequency shifted and modulated signals $s_{sc}(n, t)$. Further, the power scaled, frequency shifted and modulated signals $s_{sc}(n, t)$ may be combined by the adder (not illustrated) to generate the DMB signal $s_{DMB}(t)$. In this case equation (6) and (8) may be rewritten as:

$$s_{DMB}(t) = \sum_{n=1}^{N_{DMB}} e^{-j2\pi f_n t} K_n \sum_p b_n[p] h_n(t - p\tau_n T_{DMB}) \quad (9)$$

$$s_1(t) = \sum_p b_1[p] h_1(t - p\tau_1 T_{DMB}) \cdot K_1 e^{-j2\pi f_1 t} \quad (10)$$

In certain embodiments, controller 202-5 may assign a different time acceleration factor $\tau_n$ to each sub-carrier and RRC pulse generator bank 202-3 may act accordingly. In one embodiment, for at least one symbol subsets $b_1[p]$, $b_2[p]$ ... $b[p]$ the time acceleration factor $\tau_n$ of the associated sub-carrier may be set to 1, such sub-carrier may be used by receiver 206 to extract the related timing information. In certain embodiments, the sub-carrier for which the time acceleration factor $\tau_n$ is set as 1 may be located around mid-spectrum. By way of example, if a signal carrier has a bandwidth of 125 GHz and this signal carrier is break down to sub-carriers having wavelength of 25 GHz each. The first sub-carrier may have a spectrum of 191 THz-191.025 THz, the second sub-carrier may have a spectrum of 191.026 THz-191.050 THz, the third sub-carrier may have a spectrum of 191-.051 THz-191.075 THz and so on. In the above example, the third sub-carrier having a mid-spectrum range may be processed with the time acceleration factor $\tau_n$ equal to 1.

Other sub-carriers can be set to any other values, smaller than 1. However, in certain embodiments, a minimum value to which the time acceleration factor may be reduced is given by $$\frac{1}{1+\alpha_n},$$

where $\alpha_n$ is the roll-off factor for the RRC pulse of the nth sub-carrier. Also, the frequency shift $f_n$ of the nth sub-carrier n may be selected by controller 202-5 in such a manner that the plurality of signals $s_1(t)$, $s_2(t)$, $s_2(t)$, ... $s_n(t)$ do not overlap in the frequency domain, thus frequency domain orthogonality is maintained.

The signal $s_{DMB}(t)$ as represented by equation (6) may be transmitted by transmitter 202 towards receiver 206 via communication channel 204. As previously discussed, communication channel 204 may be a wireless channel or an optical channel depending on nature of communication system 200. The receiver 206 may be configured to receive the signal $s_{DMB}(t)$ transmitted over communication channel 204. At the receiver side, the received signal may be represented as:

$$r(t) = s_{DMB}(t) \otimes h_{channel}(t) + z(t) \quad (11)$$

where $s_{DMB}(t)$ is the transmitted signal, $h_{channel}(t)$ is the impulse response of communication ⊗ channel 204 and $z(t)$ is the additive white Gaussian noise (AWGN), where the symbol refers to the convolution operation.

In order to recover the symbols in the conveyed $s_{DMB}(t)$, the received signal $s_{DMB}(t)$ is first down-converted to baseband signals by receiver 206. In certain embodiments, receiver 206 may include a signal down-convertor (not illustrated for the purpose of simplicity) configured to down-convert the received signal $s_{DMB}(t)$ into a plurality of baseband signals $r_1(t)$, $r_2(t)$, ... $r_n(t)$ associated with the plurality of symbol subsets $b_1[p]$, $b_2[p]$ ... $b_n[p]$. It is to be noted that the process of converting the received signal $s_{DMB}(t)$ into first down-converted to baseband is well known in the art. The kth baseband signal corresponding to signal $s_k(t)$ may be represented as follows:

$$r_k(t) = e^{j2\pi f_k t} \cdot \left( \sum_{n=1}^{N_{DMB}} e^{-j2\pi f_n t} \sum_p b_n[p] h_n(t - p\tau_n T_{DMB}) + z(t) \right) = \quad (12)$$

$$\sum_p b_k[p] h_k(t - p\tau_k T_{DMB}) +$$

$$e^{j2\pi f_k t} \cdot \left( \sum_{n=1, n \neq k}^{N_{DMB}} e^{-j2\pi f_n t} \sum_p b_n[p] h_n(t - p\tau_n T_{DMB}) + z(t) \right)$$

The baseband signal $r_k(t)$ includes three main components. The first component is $\Sigma E_p b_k[p] h_k(t-p\tau_k T_{DMB})$ which takes the form of single carrier FTN signaling, the second component $e^{j2\pi f_k t}$. ( $$\sum_{n=1, n \neq k}^{N_{DMB}} e^{-j2\pi f_n t} \sum_p b_n[p] h_n(t - p\tau_n T_{DMB})$$

) which is the signal due to other sub-carriers. This component may be nulled when applying matched filtering or MMSE filter during further processing as it contributes to out of band spectrum. Finally, the third part is $e^{j2\pi f_k t} \cdot z(t)$ which is circularly rotated AWGN noise. Therefore, the design and filtering of receive filtering for FTN-DMB transmission may be same as single carrier FTN signaling.

In certain embodiments, the FTN signaling may induce ISI in the plurality of signals $s_1(t)$, $s_2(t)$, $s_2(t)$, ... $s_n$. In order to reduce, or in some cases, to eliminate the effect of ISI, communication system 200 may rely on various techniques. In some techniques, all the symbol subsets $a_1[p]$, $a_2[p]$ ... $a_n[p]$ are linearly pre-equalized at transmitter 202 and a whitened match filter is implemented on receiver 206. In some other techniques, all the processing is done at receiver 206 by implementing MMSE filter. In yet another technique, some of the symbol subsets $a_1[p]$, $a_2[p]$ ... $a_n[p]$ are linearly pre-equalized at transmitter 202 and are processed using the whitened matched filter at receiver 206. The remaining symbol subsets $a_1[p], a_2[p] \ldots a_n[p]$ which are not linearly pre-equalized at transmitter 202 are processed using the MMSE filter.

The receiver 206 may operate in synchronization with transmitter in a manner that receiver 206 may be aware of the operations performed on the symbol dataset a[m]. The receiver 206 may be aware about the number of subsets into which the symbol dataset a[m] is being divided, the subsets of symbols onto which linear pre-equalization has been performed and the subsets of symbols onto which no linear pre-equalization has been performed. With this said, controller 208 may be configured to segregate (e.g. split, divide, separate, partition or the like) the plurality of baseband signals $r_1(t), r_2(t), \ldots r_n(t)$ based on a manner by which the plurality symbol subsets $a_1[p], a_2[p] \ldots a_n[p]$ have been processed by transmitter 202. The controller 208 may forward portions of the segregated baseband signals to MMSE based receiver 206-1, turbo decoding based receiver 206-2, and whitened matched filter-based receiver 206-3 depending how the corresponding symbol subsets $a_1[p], a_2[p] \ldots a_n[p]$ have been processed at transmitter 202 and the system requirements.

By way of example, the baseband signals corresponding to the symbol subsets that have not been linearly pre-equalized may be forwarded to MMSE based receiver 206-1 and/or turbo decoding based receiver 206-2 for further processing, whereas, the symbol subsets that have been linearly pre-equalized may be forwarded to whitened matched filter-based receiver 206-3. In certain embodiments, it may be a case where none of symbol subsets $a_1[p]$, $a_2[p] \ldots a_n[p]$ has been pre-equalized, in such embodiments, all of the baseband signals may be forwarded to MMSE based receiver 206-1 and/or turbo decoding based receiver 206-2. Also, in certain embodiments, all of the symbol subsets $a_1[p], a_2[p] \ldots a_n[p]$ have been linearly pre-equalized, in such embodiments, all of the baseband signals may be forwarded to whitened matched filter-based receiver 206-1.

Figure 6:
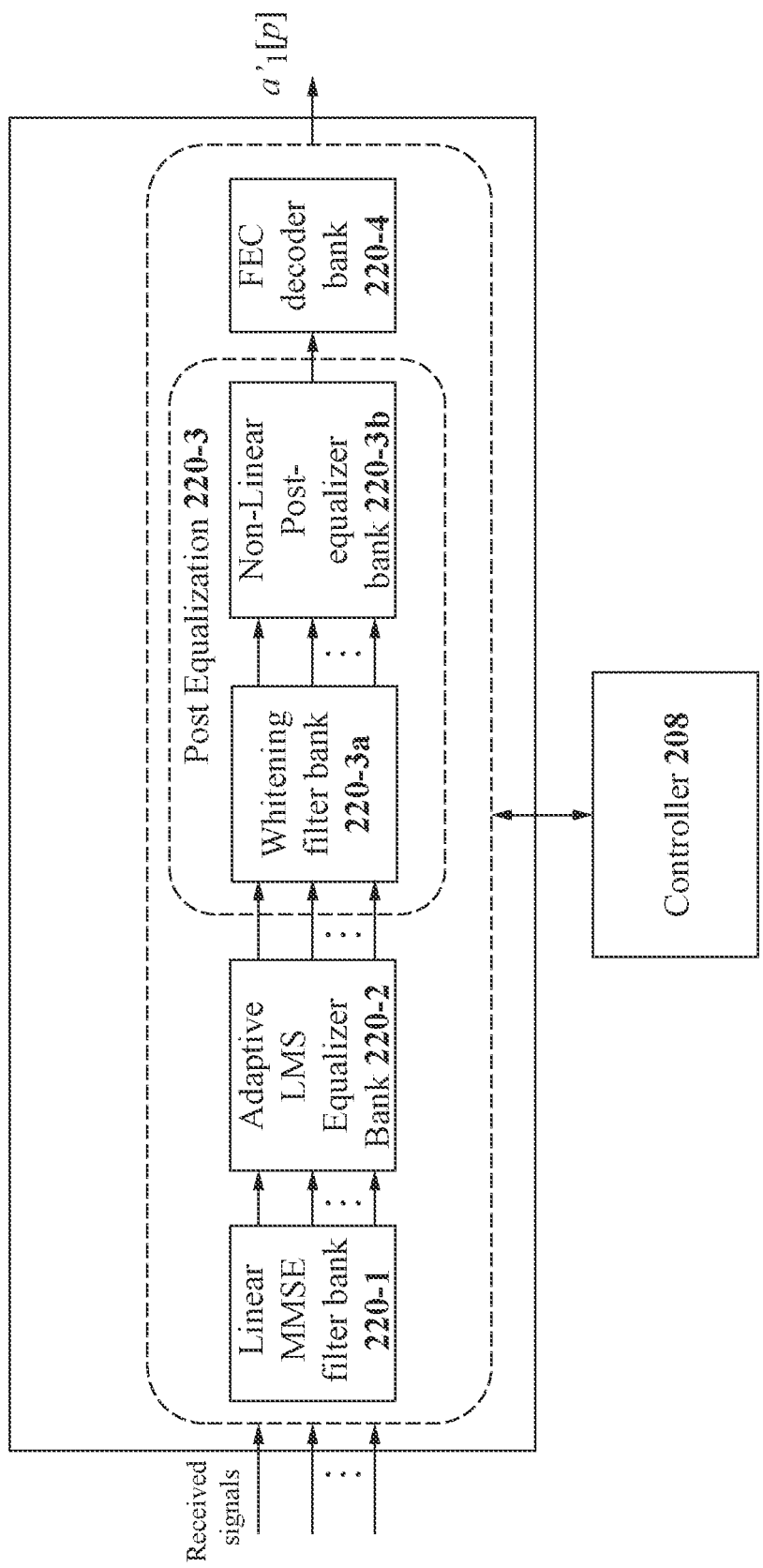
FIG. 6 illustrates a high-level functional block diagram of a MMSE based receiver configured to extract symbols from the baseband signals, in accordance with various embodiments of present disclosure.

With this said, FIG. 6 illustrates a high-level functional block diagram of MMSE based receiver 206-1 configured to extract symbols from the baseband signals, in accordance with various embodiments of present disclosure. As shown, MMSE based receiver 206-1 may include a linear MMSE filter bank 220-1, an adaptive linear minimum mean square (LMS) equalizer bank 220-2, a post equalization module 220-3, and a forward error correction (FEC) decoder bank 220-4. The MMSE based receiver 206-1 may include other components but have not been illustrated for the purpose of simplicity.

The linear MMSE filter bank 220-1 may include a plurality of MMSE filters where each of the MMSE filters may be designed to process individual baseband signals based on the impulse response of the RRC pulse generators. In certain embodiments, the response of each MMSE filter may be expressed as:

$$H_{MMSE_k} = \frac{H^*_{RRC_k}}{H^*_{RRC_k} H_{RRC_k} + \sigma^2} \quad (13)$$

where $H_{RRC_k}$ is the frequency response of the RRC pulse generator related to kth baseband signal as represented by equation (13). By way of example, if the symbol subset $a_1$ [m] is processed by the RRC pulse generator having an impulse response of $h_1(t)$, then $H_{RRC_k}$ may be equal to frequency response of $h_1(t)$ and may be represented by $H_{RRC_1}$. $\sigma^2$ may be the noise variance. The MMSE filter may provide a balance between interference cancellation (due to FTN) and noise enhancement.

The linear MMSE filter bank 220-1 may operate to reduce ISI introduced due to FTN signaling based modulation of the plurality of symbol subsets $b_1[p], b_2[p] \ldots b_n[p]$. Further, in certain embodiments, if the channel is optical, MMSE based receiver 206-1 may rely on adaptive LMS equalizer bank 220-2 to equalize the optical channel effect. The adaptive LMS equalizer bank 220-2 may include a plurality of LMS equalizers configured to operate on output from linear MMSE filter bank 220-1 to reverse the effect of channel of the received signal.

It is to be noted that the application of such linear equalizers as the linear MMSE filter or the adaptive LMS equalizers (or both) as the receiver filter may result in noise enhancement and coloring. Noise coloring means that the received noise may no longer be white, and this may degrade the bit-error rate (BER) performance of MMSE based receiver 206-1 and/or turbo decoding based receiver 206-2. Moreover, most of the conventional FEC decoders assume that the received symbols are formed from the transmitted symbols contaminated with white noise. Under this assumption, the FEC decoder design performance and optimization is performed. Hence the presence of colored noise may degrade the convergence behavior of the FEC decoder.

In order to avoid the performance degradation due to noise coloring, in certain embodiments, MMSE based receiver 206-1 may perform post-equalization noise whitening using post equalization module 220-3. Post equalization module 220-3 may include a whitening filter bank 220-3a and a non-linear post-equalizer bank 220-3b. In the post equalization stage, the received signal after MMSE and adaptive filtering, may be filtered using whitening filters included in whitening filter bank 220-3a, that may be designed to whitened to the noise.

Further, the whitening process may result in correlated symbols, which may be recovered, without noise enhancement, by using the Bahl, Cocke, Jelinek and Raviv (BCJR) algorithm, Soft-Output Viterbi Algorithm (SOVA) or Decision Feedback Equalizer (DFE). The BCJR, SOVA and DFE are non-linear equalizers that may be implemented in non-linear post-equalizer bank 220-3b. The non-linear post-equalizer bank 220-3b may recover the transmitted symbols without noise enhancement or coloring and compute log-likelihood ratios (LLRs) from the output of the linear MMSE filter bank 220-1 (or from the output of adaptive LMS equalizer bank 202-2 in case of optical channel) that may be forwarded to FEC decoder bank 220-4.

It is contemplated that the choice of the type of the non-linear equalizer to use is a system design parameter that may be a trade-off between performance and complexity of receiver 206. With the reduction in value of the FTN time acceleration factor $\tau_n$, the severity of induced ISI due to FTN signaling may increase, thus the implementation of a more powerful, yet complex, equalizer may be required. For instance, controller 208 may select DFE based non-linear equalizer (lower complexity) when $0.9 < \tau_n < 1$ and BCJR based equalizer (higher complexity) when $\tau \leq 0.9$.

The output of a non-linear pre-equalizer bank 220-3b may be forwarded to FEC decoder bank 220-4. The FEC decoder bank 220-4 may include a plurality of FEC decoder to individually decode the symbols based on computed LLRs and generate an equivalent symbol subset $a'_1[p]$ representing the symbols associated with the baseband signals provided to MMSE based receiver 206-1.

Figure 7:
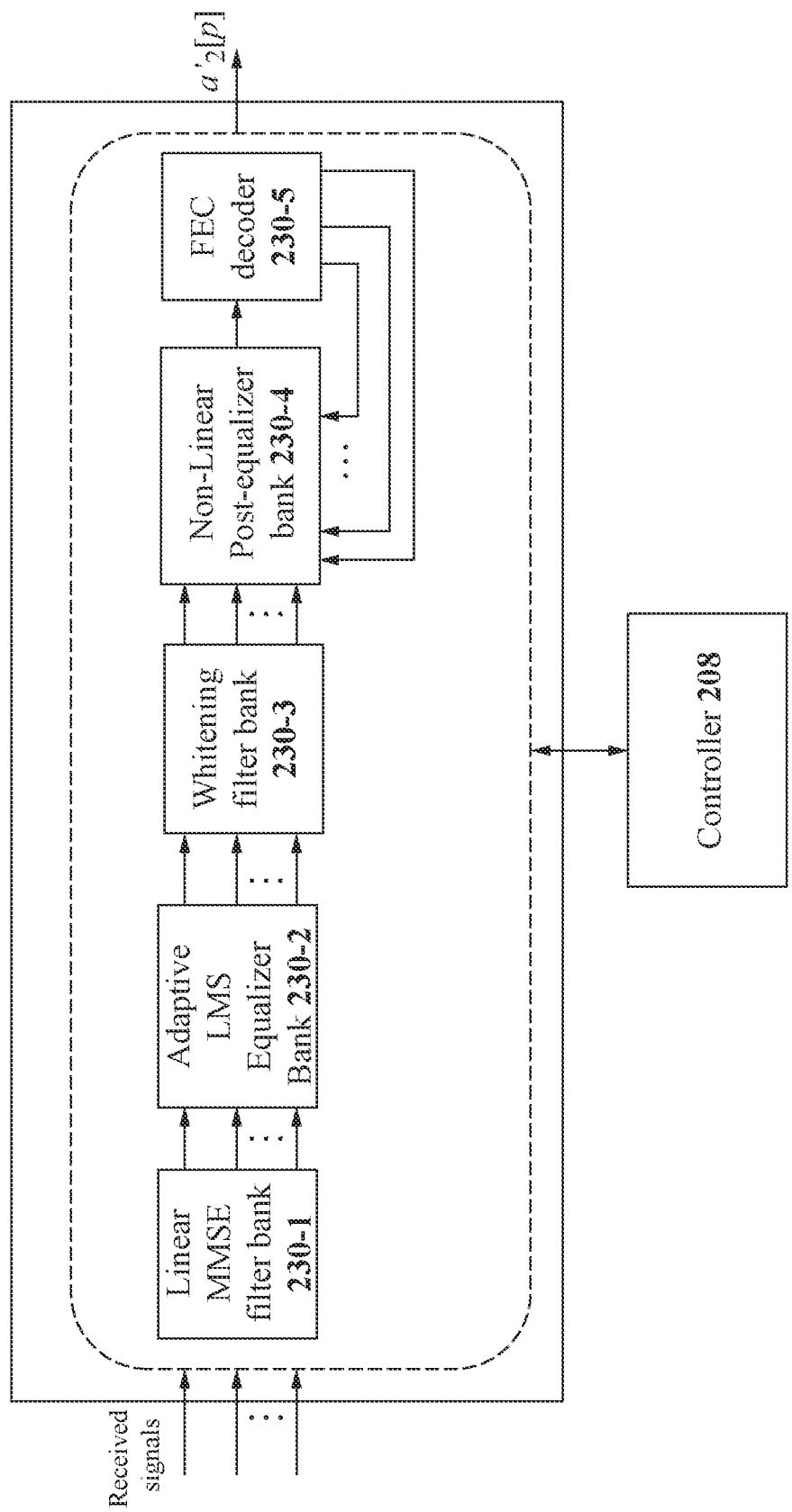
FIG. 7 illustrates a high-level functional block diagram of a turbo decoding based receiver configured to extract symbols from the baseband signals, in accordance with various embodiments of present disclosure.

In certain embodiments, in order to further improve the performance of communication system 200, turbo decoding based receiver 206-2 may be used to extract symbols from the baseband signals. FIG. 7 illustrates a high-level functional block diagram of turbo decoding based receiver 206-2 configured to extract symbols from the baseband signals, in accordance with various embodiments of present disclosure. As shown, turbo decoding based receiver 206-2 may include a linear MMSE filter bank 230-1, an adaptive linear minimum mean square (LMS) equalizer bank 230-2, whitening filter bank 230-3, a non-linear post equalizer bank 230-4 and a FEC decoder 230-5. The turbo decoding based receiver 206-2 may include other components but have not been illustrated for the purpose of simplicity.

It is to be noted that during a first turbo iteration, the operation of post equalization may be similar to post equalization stage as discussed previously with regards to MMSE based receiver 206-1 in which the received baseband signals (after MMSE and/or adaptive LMS equalizer) are passed through whitening filter bank 230-3 and non-linear post equalizer bank 230-4 to recover the symbols and to compute the LLRs that are sent to FEC decoder 230-5 as soft information. In some embodiments, FEC decoder 230-5 may be a joint FEC decoder configured to operate jointly on sub-carriers.

The joint FEC decoder 230-5 may use LLRs from all sub-carriers to estimate the transmitted symbols. After a given number of FEC decoding iterations, the joint FEC decoder 230-5 LLRs may be sent back as a selective iterative feedback to non-linear post equalizer bank 230-4 as extrinsic information. Starting from the second Turbo iteration, non-linear post equalizer bank 230-4 may generate its output based on the whitened signals generated by whitening filter bank 230-3 and the extrinsic information coming from the joint FEC decoder 230-5. The new outputs from the non-linear post equalizer bank 230-4 may be sent to joint FEC decoder 230-5 in terms of LLRs for another round of FEC decoding. This process may be terminated if FEC decoder convergences or after exceeding a given number of Turbo iterations.

In contrast to single carrier transmission, in which Turbo equalization requires to deal with the entire signal leading to huge processing requirements, joint FEC decoder 230-5 may provide a significant reduction in complexity by applying Turbo equalization to a subset of sub-carriers. Further, in certain embodiments, joint FEC decoder 230-5 may operate on selective sub-carriers. For example, only sub-carriers with $\tau_n<1$ and are not pre-equalized by transmitter 202 be involved in the Turbo equalization.

In yet another embodiment, instead of implementing joint FEC decoder, FEC decoder 230-5 may include a plurality of FEC decoders and each sub-carrier may be processed independently. Each of the plurality of FEC decoder in FEC decoder 230-5 may use the LLRs computed by the associated post-equalization stages only. After a given number of FEC iterations, the extrinsic information of a given FEC decoder may be sent back to its corresponding post equalizer to compute an updated set of LLRs. This process may be repeated till FEC convergence or achieving a maximum number of Turbo iterations.

The FEC decoder 230-5 may generate an equivalent symbol subset $a'_2[p]$ representing the symbols associated with the baseband signals provided to turbo decoding based receiver 206-2.

It will be appreciated that in various embodiments, some of the components between MMSE based receiver 206-1 and turbo decoding based receiver 206-2 may be used in sharing mode. Such components may include linear MMSE filter bank, Adaptive LMS equalizer bank, whitening filter bank, and non-linear post-equalizer.

As mentioned before, the choice of the type of the non-linear post equalizer may be a design option that may be exploited in order to further reduce complexity and/or improve performance. Therefore, in a given implementation, and for a first range of FTN time acceleration factor, a non-linear equalizer of a first type may be implemented, and for a second range of FTN time acceleration factor, a non-linear equalizer of a second type may be implemented.

Figure 8:
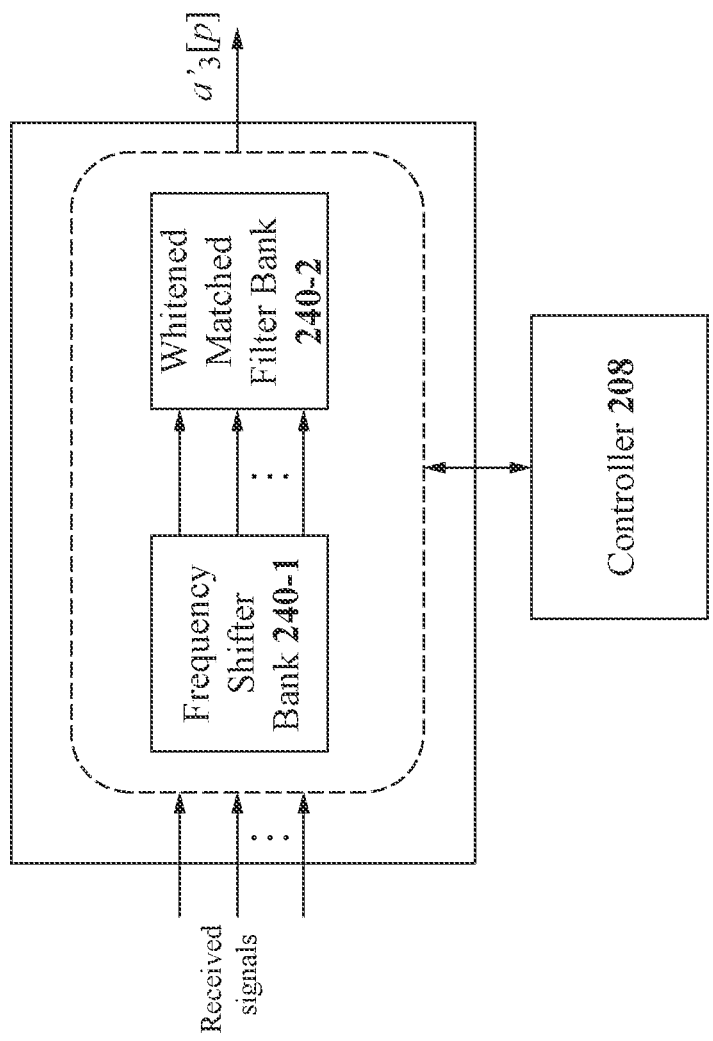
FIG. 8 illustrates a high-level functional block diagram of a matched filter-based receiver configured to extract symbols from the baseband signals, in accordance with various embodiments of present disclosure.

FIG. 8 illustrates a high-level functional block diagram of whitened matched filter-based receiver 206-3 configured to extract symbols from the baseband signals, in accordance with various embodiments of present disclosure. As shown, whitened matched filter-based receiver 206-3 may include a frequency shifter bank 240-1 and a whitened matched filter bank 240-2. The frequency shifter bank 240-1 may include a plurality of frequency shifters and whitened matched filter bank 240-2 may include a plurality of whitened matched filters. The whitened matched filter-based receiver 206-3 may include other components but have not been illustrated for the purpose of simplicity.

The controller 208 may provide the baseband signals related to the symbol subsets $a_1[p], a_2[p] \ldots a_n[p]$ that have been linearly pre-equalized by transmitter 202 to whitened matched filter-based receiver 206-3. As compared to the conventional receiver, whitened matched filter-based receiver 206-3 may include an additional filter for noise whitening known as whitening filter having a frequency response of F(z). In order to simplify the implementation, the whitened filters may be combined with matched filters to form whitened matched filters. In case, communication channel 204 is an optical channel, chromatic dispersion compensation may be performed by whitened matched filter-based receiver 206-3 and the whitened matched filters may be combined with the chromatic dispersion compensation filter. The whitening filter may be designed based on the FTN time acceleration parameter $\tau_n$.

Given that the transmit pulses are RRC pulses with roll-off factor $\alpha$ and FTN time acceleration factor $\tau_n$, in order to design B(z) (for transmitter side) and F(z) (for receiver side), the spectral factorization of the RC impulse response (sampled at every $T_nT$ intervals) may be performed. The minimum-phase component after the factorization may be used as the FBF B (z) in linear pre-equalizer 202-2a and the inverse of the maximum-phase component is used as the whitening filter F(z) in whitened matched filter bank 240-2 after the matched-filtering stage. The spectral factorization process of the raised cosine impulse response may be written as:

$$G(z) = Z\{h_n(t) \otimes h_n^*(-t)\}_{t=m\tau_nT} = \beta Q(z) Q^*\left(\frac{1}{z^*}\right) \quad (14)$$

where $h_n(t)$ may be the RRC impulse response, $Z\{.\}$ may be the z-transform of its argument, Q(z) and $$Q^*\left(\frac{1}{z^*}\right)$$

are me minimum-phase and maximum-phase component of G(z), respectively and $\beta$ may be a scaling factor used to make Q(z) monic. Finally, B(z) and F(z) may be selected as:

$$F(z) = \frac{1}{Q^*\left(\frac{1}{z^*}\right)}, B(z) = Q(z) \qquad (15)$$

The whitened matched filter bank 240-2 may generate an equivalent symbol subset a'$_3$[m] representing the symbols associated with the baseband signals provided to whitened matched filter-based receiver 206-3. Returning to FIG. 3, combiner 210 may be configured to combine equivalent symbol subsets a'$_1$[p], a'$_2$[p], a'$_3$[p] and generate an equivalent symbol dataset a'[m] representing the original symbol dataset a[m].

Figure 9A:
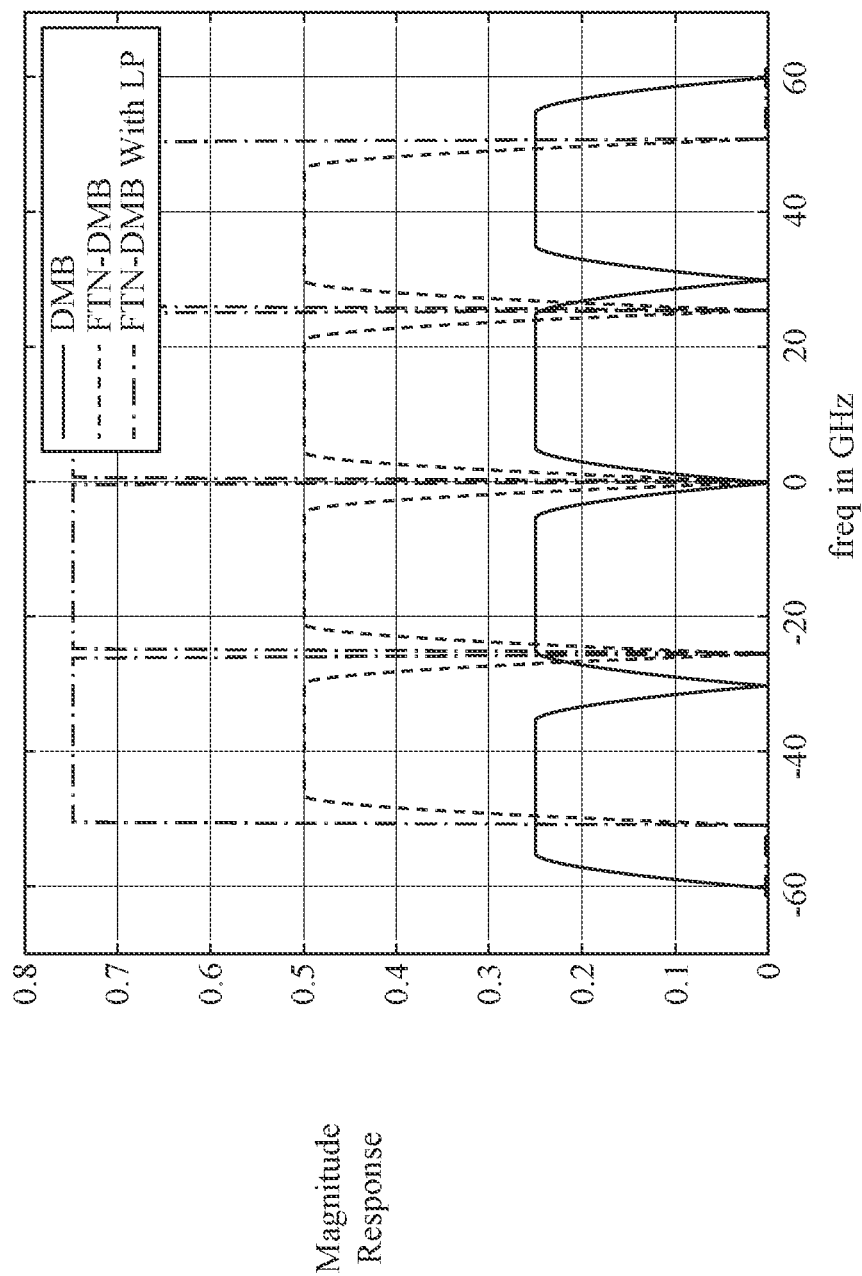
FIG. 9A illustrates an example for the required bandwidth in case of DMB transmission with Nyquist signaling, with FTN-DMB signaling, and FTN-DMB with linear pre-equalization in order to achieve the same data rate, in accordance with various embodiments of present disclosure.

FIG. 9A illustrates an example for the required bandwidth in case of DMB transmission with Nyquist signaling, with FTN-DMB signaling, and FTN-DMB with linear pre-equalization in order to achieve the same data rate, in accordance with various embodiments of present disclosure. In this example, RRC transmit pulse has a roll off factor α of 0.2. The target baud rate is 100G symbol/second or equivalently 25G per sub-carrier. In case of DMB transmission, the required bandwidth is BW$_{DMB}$=(1+0.2)*100G=120 GHz. In case of FTN-DMB signaling, the time acceleration factor τ$_r$, for all sub-carriers was set to 0.85. Thus, the required bandwidth reduces to BW$_{FTN\_DMB}$=(1+0.2) *0.85*100G=102 GHz. There is a significant saving of 18 GHz of spectrum.

Figure 9B:
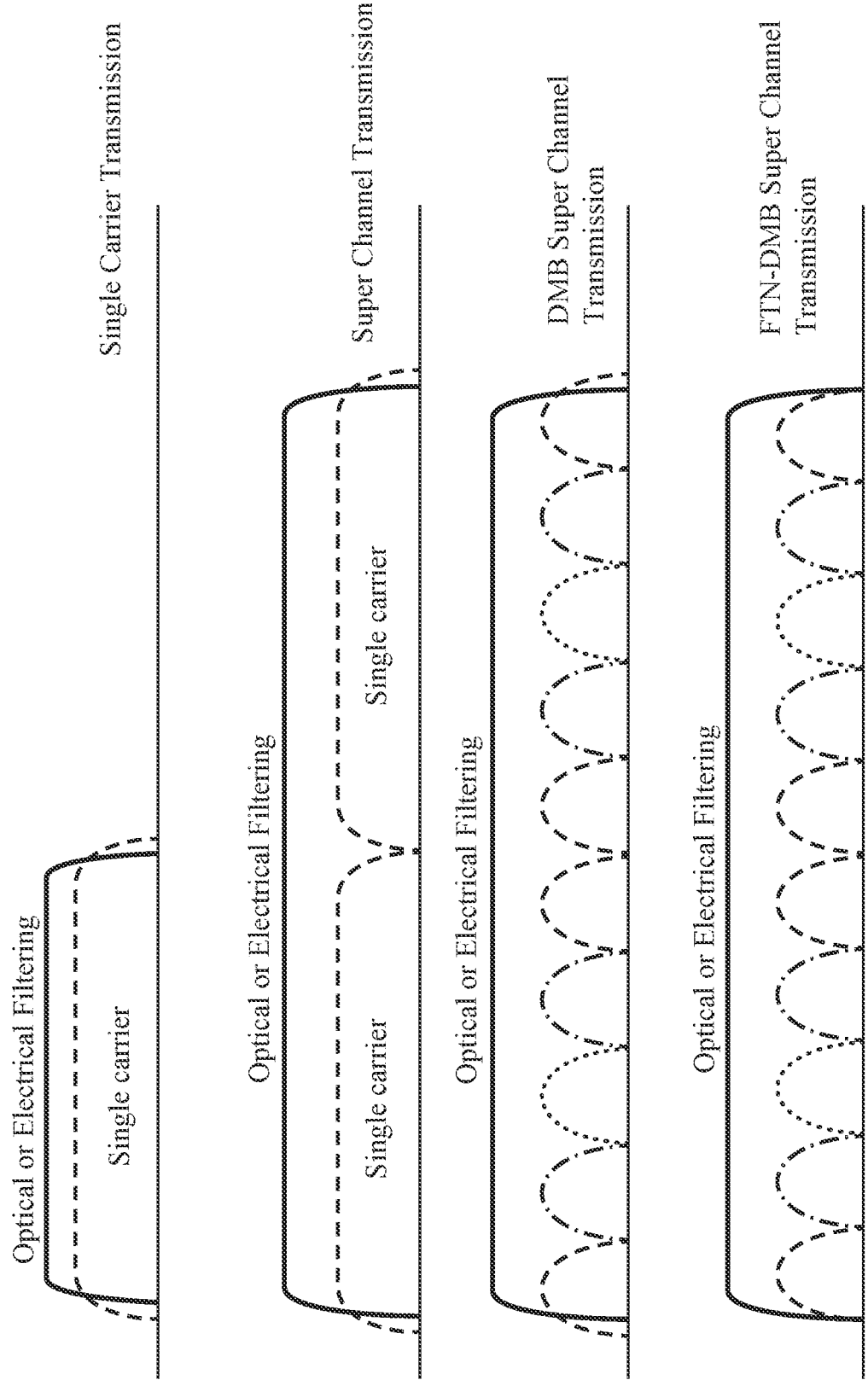
FIG. 9B illustrates an example of implementation of FTN-DMB based signal transmission in accordance with various embodiments of present disclosure.

FTN-DMB based signal transmission may be used in super-channel application. FIG. 9B illustrates an example of implementation of FTN-DMB based signal transmission in accordance with various embodiments of present disclosure. A super channel is the transmission of two or more optical carriers as if they are one massive carrier. For example, in case of single carrier transmission, the transmission bandwidth may be 100 GHz, and all the optical and electrical components in the system should support this bandwidth. If the signal bandwidth exceeds 100 GHz, it will be filtered by the system components. A super channel transmission of two carriers may result in a transmission bandwidth of 200 GHz and all the system components should support 200 GHz bandwidth. If the signal bandwidth exceeds 200 GHz, it may be filtered by the system components. In order to avoid being filtered, FTN-DMB signaling may be applied per sub-carrier to reduce the transmission bandwidth as a method to balance the inter-channel interference (ICI) and intra-channel inter-symbol interference (ISI).

Figure 10:
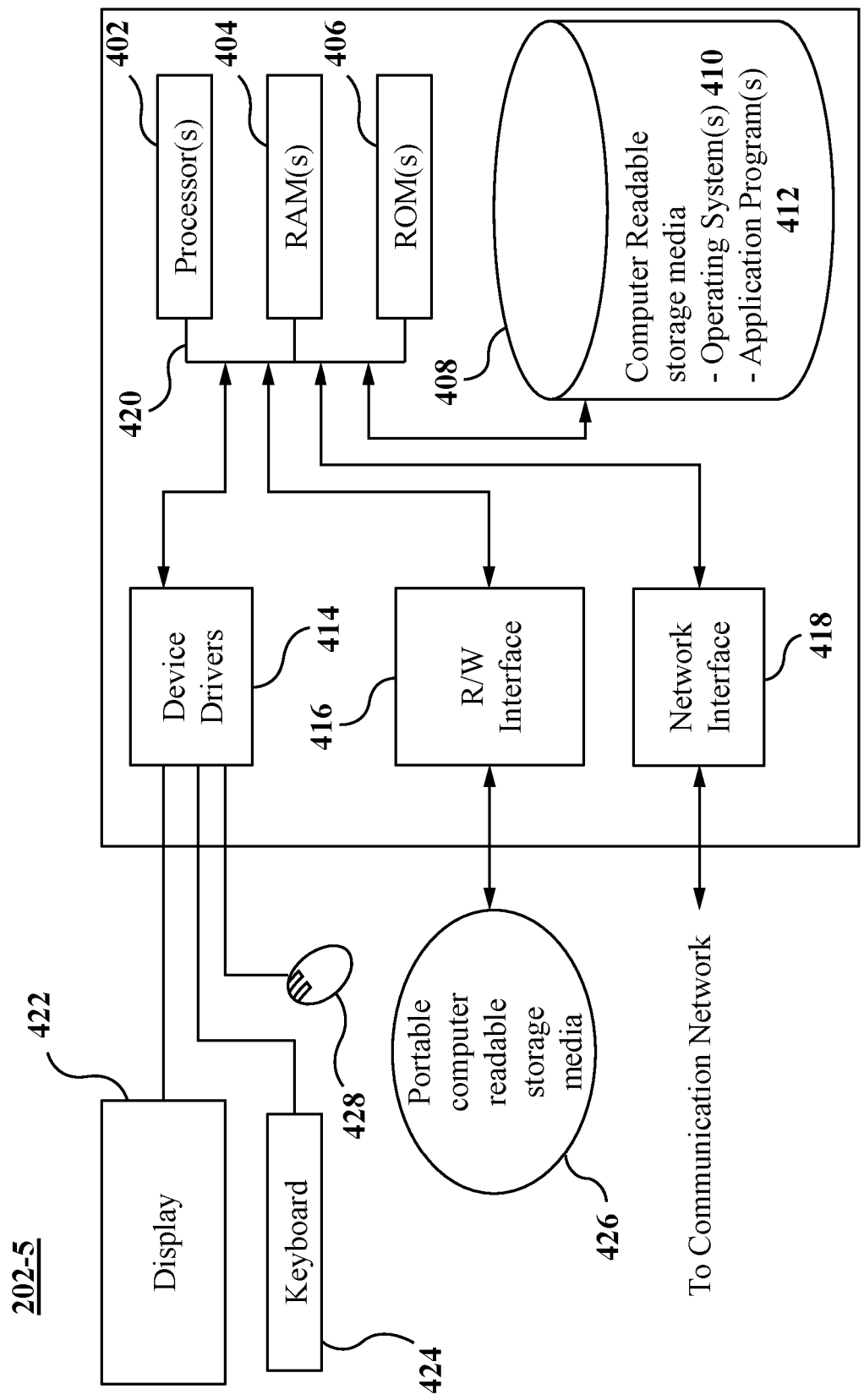
FIG. 10 depicts a high-level block diagram of exemplary components of controller, in accordance with various embodiments of the present disclosure.

FIG. 10 depicts a high-level block diagram of exemplary components of controller 202-5, in accordance with various embodiments of the present disclosure. It is to be noted that controller 208 may also be implemented in a similar manner. It should be appreciated that FIG. 10 provides only an illustration of one implementation of controllers 202-5 and 208 and does not imply any limitations with regard to the environments in which different embodiments may be implemented. Many modifications to the depicted environment can be done to implement controllers 202-5 and 208 without departing from the principles presented herein. The controllers 202-5 and 208 may be a server, a desktop computer, a laptop computer, or any device that may be configured to implement the present technology, as should be understood by a person skilled in the art.

As shown, controller 202-5 employs one or more processors 402, one or more computer-readable random access memories (RAMs) 404, one or more computer-readable read only memories (ROMs) 406, one or more computer-readable storage media 408, device drivers 414, a read/write (R/W) driver interface 416, a network interface 418, all interconnected over a communication fabric 420. The communication fabric 420 may be implemented by any architecture designed for passing data and/or control information between processors (such as microprocessors, communications and network processors, etc.), system memory, peripheral devices, and any other hardware components within a system.

One or more operating systems 410 and one or more application programs 412 are stored on one or more of computer-readable storage media 408 for execution by one or more of the processors 402 via one or more of respective RAMs 404 (which typically include a cache memory). In the illustrated embodiment, each of the computer-readable storage media 408 may be a magnetic disc storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The R/W driver interface 416 reads from and writes to one or more portable computer-readable storage media 426. The application programs 412 may be related communication system 200 and stored on one or more of portable computer-readable storage media 426, read via the respective R/W driver interface 416 and loaded into the respective computer-readable storage media 408.

Further, network interface 418 may be based on a TCP/IP adapter card or wireless communication adapter (such as a 4G wireless communication adapter using OFDMA technology). The application programs 412 on controller 202-5 may be downloaded to controller 202-5 from an external computer or external storage device via a communication network (for example, the Internet, a local area network or other wide area network or wireless network) and network interface 418. From network interface 418, application programs 412 may be loaded onto the computer-readable storage media 408. The controller 202-5 may connect to routers, firewalls, switches, gateway computers and/or edge servers of the communication network using copper wires, optical fibers, wireless transmission, and the like.

The controller 202-5 may also include a display screen 422, a keyboard or keypad 424, and a computer mouse or touchpad 428. The device drivers 414 may interface with display screen 422 for imaging, with the keyboard or the keypad 424, with computer mouse or touchpad 428, and/or with display screen 422 (which may be a touch sensitive display) for alphanumeric character entry and user selections. The device drivers 414, R/W driver interface 416 and network interface 418 may comprise hardware and software (stored on the computer-readable storage media 408 and/or the ROM 406).

Figure 11:
FIG. 11 depicts a flowchart representing a process corresponding to a method for Multi-Band Faster-than-Nyquist scheme-based communication implemented on communication system, in accordance with various embodiments of the present disclosure.

FIG. 11 depicts a flowchart representing a process 500 corresponding to a method for Multi-Band Faster-than-Nyquist scheme-based communication implemented on communication system 200, in accordance with various embodiments of the present disclosure. As shown, process 500 begins at step 502, where communication system 200 splits a symbol dataset a[m] into symbol subsets a$_1$[p], a$_2$[p] . . . a$_n$[p]. As noted above, data separator 202-1 may receive a symbol dataset a[m]. The data separator 202-1 may be configured to break (e.g. split, divide, segregate, separate, partition or the like) the symbol dataset a[m] to smaller symbol subsets a$_1$[p], a$_2$[p] . . . a$_n$[p].

The process 500 advances to step 504, where communication system 200 modulates the symbol subsets a$_1$[p], a$_2$[p] . . . a$_n$[p] using different sub-carriers, roll off factors and time acceleration factors, wherein the modulation is based on a Faster-than-Nyquist (FTN) scheme. As discussed above, RRC pulse generator bank 202-3 includes a plurality of RRC pulse generators that are configured to modulate the pre-equalized symbol subsets $b_1[p], b_2[p] \ldots b_n[p]$. Each of the plurality of RRC pulse generators in RRC pulse generator bank 202-3 may have a different frequency response to modulate the pre-equalized symbol subsets $b_1[p], b_2[p] \ldots b_n[p]$ individually using different sub-carriers, roll off factors and time acceleration factors based on FTN scheme.

The process 500 moves to step 506, where communication system 200 performs frequency shifting on the modulated symbol subsets $a_1[p], a_2[p] \ldots a_n[p]$. As noted previously, frequency shifter bank 202-4 includes a plurality of frequency shifters that are configured to provide a frequency shift to the $s_{sc}(n, t)$ represented by $e^{-j2\pi f_n t}$, where $f_n$ may be the amount of frequency shift.

The process 500 advances to step 508, where communication system 200 combines the frequency shifted and modulated symbol subsets $a_1[p], a_2[p] \ldots a_n[p]$ to generate a digital multiband (DMB) signal $s_{DMB}(t)$ to be transmitted over a communication channel. As previously discussed, The transmitter 202 includes an adder that is configured to combine the plurality of signals $s_i(t), s_2(t), s_2(t), \ldots s_n(t)$ to generate the DMB signal $s_{DMB}(t)$ as represented by equation (6) to be transmitted over a communication channel.

The process 500 proceeds to step 510, where communication system 200 transmits the DMB $s_{DMB}(t)$ over a communication channel. As noted previously, the signal $s_{DMB}(t)$ as represented by equation (6) may be transmitted by transmitter 202 towards receiver 206 via communication channel 204.

The process 500 moves to step 512, where communication system 200 receives the DMB signal $s_{DMB}(t)$ transmitted over the communication channel. As discussed above, receiver 206 is configured to receive the signal $s_{DMB}(t)$ transmitted over communication channel 204.

The process 500 advances to step 514, where communication system 200 down-converts the received DMB signal $s_{DMB}(t)$ into a plurality of baseband signals $r_1(t), r_2(t), \ldots r_n(t)$ associated with the plurality symbol subsets $a_1[p], a_2[p] \ldots a_n[p]$ respectively. As previously noted, the received signal $s_{DMB}(t)$ is first down-converted to baseband signals by receiver 206.

The process 500 proceeds to step 516, where communication system 200 segregates the plurality of baseband signals $r_1(t), r_2(t), \ldots r_n(t)$ based on a manner by which the plurality symbol subsets $a_1[p], a_2[p] \ldots a_n[p]$ have been processed before transmission. As previously discussed, controller 208 is configured to segregate (e.g. split, divide, separate, partition or the like) the plurality of baseband signals $r_1(t), r_2(t), \ldots r_n(t)$ based on a manner by which the plurality symbol subsets $a_1[p], a_2[p] \ldots a_n[p]$ have been processed by transmitter 202.

The process 500 moves to step 518, where communication system 200 forwards a first portion of the plurality of baseband signals $r_1(t), r_2(t), \ldots r_n(t)$ to a minimum mean square error (MMSE) based receiver for further processing. As noted previously, controller 208 may forward portions of the segregated baseband signals to MMSE based receiver 206-1 for further processing.

The process 500 proceeds to step 520, where communication system 200 forwards a second portion of the plurality of baseband signals $r_1(t), r_2(t), \ldots r_n(t)$ to a matched filter-based receiver for further processing. As noted above, controller 208 may forward portions of the segregated baseband signals to matched filter-based receiver 206-3 for further processing.

Finally, at step 522, communication system 200 combines the output of the MMSE based receiver and matched filter-based receiver to generate an equivalent symbol dataset a'[m] representing a transmitted symbol dataset a[m]. As previously noted, combiner 210 may be configured to combine equivalent symbol subsets $a'_1[p], a'_2[p], a'_3[p]$ and generate an equivalent symbol dataset a'[m] representing the original symbol dataset a[m].

Thus, by virtue of communication system 200, transmission bandwidth may be reduced without reducing spectral efficiency to mitigate filtering effects and spectral efficiency may be improved in a given bandwidth. Further, flexible implementation strategy in which each sub-carrier may have a different modulation format, shaping gain and transmission bandwidth optimized independently of the other sub-carriers, in order to allow system convergence (as solving TR issues), or to maximize performance gains, or to reduce the implementation resources. Also, the sub-carriers with FTN time acceleration factor $\tau_n < 1$, several techniques to reduce the induced ISI due to FTN signaling, as MMSE equalizer, post-equalization, Turbo equalization and Linear pre-equalization, may be applied in order to reduce implementation resources without sacrificing performance targets.

It is to be understood that the operations and functionality of communication system 200, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A transmitter comprising:
   a data separator configured to split a symbol dataset a[m] into symbol subsets $a_1[p], a_2[p] \ldots a_n[p]$, where m is an index of a symbol in the symbol dataset a[m], p is an index of a symbol in the symbol subsets $a_1[p], a_2[p] \ldots a_n[p]$, and n is an integer value defining a total number of the symbol subsets $a_1[p], a_2[p] \ldots a_n[p]$;
   a plurality of root raised cosine (RRC) pulse generators configured to individually modulate the symbol subsets $a_1[p], a_2[p] \ldots a_n[p]$ using different sub-carriers, roll off factors and time acceleration factors, wherein the modulation is based on a Faster-than-Nyquist (FTN) scheme;
   a plurality of frequency shifters configured to provide a frequency shift to the modulated symbol subsets $a_1[p], a_2[p] \ldots a_n[p]$; and
   an adder configured to combine the frequency shifted and modulated symbol subsets $a_1[p], a_2[p] \ldots a_n[p]$ to generate a digital multiband (DMB) signal $s_{DMB}(t)$ to be transmitted over a channel.

2. The transmitter of claim 1, wherein at least one of the symbol subsets $a_1[p], a_2[p] \ldots a_n[p]$ is pre-equalized by a linear pre-equalizer prior to modulating the at least one of the symbol subsets $a_1[p], a_2[p] \ldots a_n[p]$.

3. The transmitter of claim 1, wherein the DMB signal $s_{DMB}(t)$ is represented as:

$$s_{DMB}(t) = \sum_n e^{-j2\pi f_n t} \sum_p a_n[p] h_n(t - p\tau_n T_{DMB})$$

Where:
$h_n(t-p\tau_n T_{DMB})$ is an impulse response of nth RRC pulse generator, $T_{DMB}$ is a symbol period,
$\tau_n$ is a time acceleration factor of the nth RRC pulse generator by which the symbol period $T_{DMB}$ is modified, where $0<\tau_n \leq 1$, and
$f_n$ is an amount of frequency shift provided to the modulated symbol subset $a_n[p]$.

4. The transmitter of claim 3, wherein for at least one of the symbol subsets $a_1[p], a_2[p] \ldots a_n[p]$, a value of the time acceleration factor $x_n$ is equal to one.

5. The transmitter of claim 1 further comprises a plurality of power scalers configured to scale powers of the frequency shifted and modulated symbol subsets $a_1[p], a_2[p] \ldots a_n[p]$ prior to combining by the adder.

6. A receiver comprising:
a signal down-converter configured to down convert a received digital multiband (DMB) signal $s_{DMB}(t)$ into a plurality of baseband signals $r_1(t), r_2(t), \ldots r_n(t)$ associated with a plurality symbol subsets $a_1[p], a_2[p] \ldots a_n[p]$ respectively, where p is an index of a symbol in the symbol subsets $a_1[p], a_2[p] \ldots a_n[p]$, and n is an integer value defining a total number of the plurality of baseband signals $r_1(t), r_2(t), \ldots r_n(t)$ and a total number of the plurality symbol subsets $a_1[p], a_2[p] \ldots a_n[p]$;
a controller configured to:
segregate the plurality of baseband signals $r_1(t), r_2(t), \ldots r_n(t)$ in accordance with a manner by which the plurality symbol subsets $a_1[p], a_2[p] \ldots a_n[p]$ have been processed by a transmitter,
forward a first portion of the plurality of baseband signals $r_1(t), r_2(t), \ldots r_n(t)$ to a minimum mean square error (MMSE) based receiver for further processing, and
forwarding a second portion of the plurality of baseband signals $r_1(t), r_2(t), \ldots r_n(t)$ to a matched filter-based receiver for further processing; and
a combiner configured to combine an output of the MMSE based receiver and matched filter-based receiver to generate an equivalent symbol dataset a'[m] representative of a transmitted symbol dataset a[m], where m is an index of a symbol in the symbol dataset a'[m].

7. The receiver of claim 6, wherein the MMSE based receiver comprises:
a plurality of linear MMSE filters configured to process individual baseband signals to reduce inter-symbol interference introduced due to Faster-than-Nyquist (FTN) scheme based modulation of the plurality symbol subsets $a_1[p], a_2[p] \ldots a_n[p]$;
a post equalization module including a plurality of whitening filters and a plurality of non-linear post-equalizers configured to perform post-equalization noise whitening and compute log-likelihood ratios (LLRs) from outputs of the plurality of linear MMSE filters; and a plurality of forward error correction (FEC) decoders configured to individually decode the received symbols in the baseband signals based on LLRs.

8. The receiver of claim 7, wherein a type of the non-linear post-equalizer is selected based on a time acceleration factor $\tau n$.

9. The receiver of claim 8, wherein for $0.9<\tau_n<1$ the non-linear equalizer is a Decision Feedback Equalizer (DFE) based non-linear equalizer and for $\tau_1 \leq 0.9$ the non-linear equalizer is Bahl, Cocke, Jelinek and Raviv (BCJR) based non-linear equalizer.

10. The receiver of claim 7, wherein, if a channel is an optical channel, the receiver further comprises a plurality of least mean square (LMS) equalizers configured to operate on output from the plurality of linear MMSE filters to reverse an effect of channel of the received DMB signal $s_{DMB}$.

11. The receiver of claim 7, wherein the plurality of FEC decoders are turbo-decoders configured to estimate the transmitted symbols in the baseband signals based on LLRs and provide a selective iterative feedback to the plurality of non-linear pre-equalizers.

12. The receiver of claim 11, wherein the selective feedback is associated with the symbol subsets $a_1[p], a_2[p] \ldots a_n[p]$ modulated with the time acceleration factor $\tau_n<1$ and are not pre-equalized by the transmitter.

13. The receiver of claim 6, wherein the MMSE based receiver is configured to operate on the first portion of the plurality of baseband signals $r_1(t), r_2(t), \ldots r_n(t)$ whose associated symbol subsets $a_1[p], a_2[p] \ldots a_n[p]$ have not been pre-equalized by the transmitter.

14. The receiver of claim 6, wherein matched filter-based receiver comprises:
a plurality of frequency shifters configured to provide a frequency shift to the second portion of the plurality of baseband signals $r_1(t), r_2(t), \ldots r_n(t)$; and
a plurality of whitened matched filters configured to estimate transmitted symbols in the frequency shifted second portion of the plurality of baseband signals $r_1(t), r_2(t), \ldots r_n(t)$.

15. The receiver of claim 6, wherein the matched filter-based receiver is configured to operate on the second portion of the plurality of baseband signals $r_1(t), r_2(t), \ldots r_n(t)$ whose associated symbol subsets $a_1[p], a_2[p] \ldots a_n[p]$ have been pre-equalized by the transmitter.

16. A method of communication comprising:
splitting, by a data separator, a symbol dataset a[m] into symbol subsets $a_1[p], a_2[p] \ldots a_n[p]$, where m is an index of a symbol in the symbol dataset [m] and p is an index of a symbol in the symbol subsets $a_1[p], a_2[p] \ldots a_n[p]$;
modulating, by a plurality of root raised cosine (RRC) pulse generators, the symbol subsets $a_1[p], a_2[p] \ldots a_n[p]$ using different sub-carriers, roll off factors and time acceleration factors, wherein the modulation is based on a Faster-than-Nyquist (FTN) scheme;
performing frequency shifting, by a plurality of frequency shifters, on the modulated symbol sub sets $a_1[p], a_2[p] \ldots a_n[p]$;
combining, by an adder, the frequency shifted and modulated symbol subsets $a_1[p], a_2[p] \ldots a_n[p]$ to generate a digital multiband (DMB) signal $s_{DMB}(t)$ to be transmitted over a communication channel;
transmitting, by a transmitter, the DMB signal $s_{DMB}(t)$ over the communication channel;
receiving, by a receiver, the DMB signal $s_{DMB}(t)$ transmitted over the communication channel;

down converting, by a signal down-converter, the received DMB signal $s_{DMB}(t)$ into a plurality of baseband signals $r_1(t), r_2(t), \ldots r_n(t)$ associated with the symbol subsets $a_1[p], a_2[p] \ldots a_n[p]$ respectively, where n is an integer value defining a total number of the plurality of baseband signals $r_1(t), r_2(t), \ldots r_n(t)$ and a total number of the symbol subsets $a_1[p], a_2[p] \ldots a_n[p]$;

segregating, by a controller, the plurality of baseband signals $r_1(t), r_2(t), \ldots r_n(t)$ in accordance with a manner by which the symbol subsets $a_1[p], a_2[p] \ldots a_n[p]$ have been processed before transmission;

forwarding, by the controller, a first portion of the plurality of baseband signals $r_1(t), r_2(t), \ldots r_n(t)$ to a minimum mean square error (MMSE) based receiver for further processing;

forwarding, by the controller, a second portion of the plurality of baseband signals $r_1(t), r_2(t), \ldots r_n(t)$ to a matched filter-based receiver for further processing; and combining, by a combiner, an output of the MMSE based receiver and matched filter-based receiver to generate an equivalent symbol dataset a'[m] representative of the symbol dataset a[m], where m is an index of a symbol in the symbol dataset a'[m].

17. The method of claim 16, wherein the DMB signal $s_{DMB}(t)$ is represented as:

$$s_{DMB}(t) = \sum_n e^{-j2\pi f_n t} \sum_p a_n[p] h_n(t - p\tau_n T_{DMB})$$

Where:
$h_n(t-p\tau_n T_{DMB})$ is an impulse response of nth RRC pulse generator,
$T_{DMB}$ is a symbol period,
$\tau_n$ is a time acceleration factor of the nth RRC pulse generator by which the symbol period $T_{DMB}$ is modified, where $0<\tau_n\leq 1$, and
$f_n$ is an amount of frequency shift provided to the modulated symbol subset $a_n[p]$.

18. The method of claim 16 further comprises:
processing individual baseband signals, by a plurality of linear MMSE filters, to reduce inter-symbol interference introduced due to FTN scheme based modulation of the plurality symbol sub sets $a_1[p], a_2[p] \ldots a_n[p]$;
performing, by a post equalization module, post-equalization noise whitening and computing log-likelihood ratios (LLRs) from outputs of the plurality of linear MMSE filters; and
decoding, by a plurality of forward error correction (FEC) decoders, the received symbols in the baseband signals based on LLRs.

19. The method of claim 16 further comprises:
frequency shifting, by a plurality of frequency shifters, the second portion of the plurality of baseband signals $r_1(t), r_2(t), \ldots r_n(t)$; and
estimating, by a plurality of whitened matched filters, transmitted symbols in the frequency shifted second portion of the plurality of baseband signals $r_1(t), r_2(t), \ldots r_n(t)$.

20. The method of claim 16 further comprises scaling powers of the frequency shifted and modulated symbol subsets $a_1[p], a_2[p] \ldots a_n[p]$ prior to combining by the adder.

* * * * *